(12) United States Patent
Blemel

(10) Patent No.: US 7,277,822 B2
(45) Date of Patent: Oct. 2, 2007

(54) EMBEDDED SYSTEM FOR DIAGNOSTICS AND PROGNOSTICS OF CONDUITS

(76) Inventor: Kenneth G. Blemel, Sentient Sensors, LLC, 6022 Constitution Ave. NE., Albuquerque, NM (US) 87110

( * ) Notice: Subject to any disclaimer, the term of this patent is extended or adjusted under 35 U.S.C. 154(b) by 794 days.

(21) Appl. No.: 09/966,397

(22) Filed: Sep. 28, 2001

(65) Prior Publication Data
US 2002/0038199 A1 Mar. 28, 2002

Related U.S. Application Data

(60) Provisional application No. 60/236,432, filed on Sep. 28, 2000.

(51) Int. Cl.
*G06F 19/00* (2006.01)
*G01B 5/00* (2006.01)
(52) U.S. Cl. .................... 702/183; 702/34; 702/36; 324/539; 324/543
(58) Field of Classification Search ........... 702/33–36, 702/182–185, 188, 189, 40, 57–60, 64, 65; 324/512, 539, 541–543, 544
See application file for complete search history.

(56) References Cited

U.S. PATENT DOCUMENTS

| | | | | |
|---|---|---|---|---|
| 4,840,480 A | * | 6/1989 | Starke et al. | 356/32 |
| 4,988,949 A | * | 1/1991 | Boenning et al. | 324/541 |
| 5,177,468 A | * | 1/1993 | Baldwin et al. | 340/652 |
| 5,245,293 A | * | 9/1993 | Runner | 324/663 |
| 5,271,274 A | * | 12/1993 | Khuri-Yakub et al. | 73/597 |
| 5,574,213 A | * | 11/1996 | Shanley | 73/40.7 |
| 5,712,934 A | * | 1/1998 | Johnson | 385/12 |
| 5,862,030 A | * | 1/1999 | Watkins et al. | 361/103 |
| 6,265,880 B1 | * | 7/2001 | Born et al. | 324/541 |
| 6,275,050 B1 | * | 8/2001 | Born et al. | 324/700 |
| 6,286,557 B1 | * | 9/2001 | May | 138/110 |
| 6,392,551 B2 | * | 5/2002 | De Angelis | 340/584 |
| 6,512,444 B1 | * | 1/2003 | Morris et al. | 337/401 |
| 6,868,357 B2 | | 3/2005 | Furse | |
| 6,937,944 B2 | | 8/2005 | Furse | |

OTHER PUBLICATIONS

Electroactive Polymers 1: Piezoelectric Materials, http://virtualskies.arc.nasa.gov/research/youDecide/piezoElectMat.html.*
American Airlines, Inc., DC-10, N110AA, Chicago International Airport, Chicago, IL, May 25, 1979, NTSB Report #AAR-79-17, adopted on Dec. 21, 1979, NTIS Report #NTISUB/E/104-D17.
SwissAir Flight 111, Peggy's Cove, Nova Scotia, Canada, Sep. 1998, Transportation Safety Board of Canada.
Aviation Accident Report: In-Flight Breakout Over the Atlantic Ocean, Trans World Airlines, Flight 800, Boeing 747-141 N93119 near East Moriches, New York, Jul. 17, 1996, NTSB No. AAR-00/03 adopted on Nov. 28, 2000, NTIS Report #PB2000-910403.
V-22 Aircraft 2000 Crash, Navy News email, nns93038.txt, http://www.chinfo.navy.mil/navpalib/news/navnews/nns93/nns93038.txt.

* cited by examiner

*Primary Examiner*—Jeffrey R. West

(57) ABSTRACT

An apparatus providing a means for assessment of the integrity of insulated conduits, harnesses, cables, pipelines and other interconnection systems constructed with integral sensitized media, discrete sensors, and electronics providing a means for transforming sensed data into information and a means for communicating information for the purpose of understanding the location, degree and risk of damage and deterioration, and the probable causes thereof.

7 Claims, 10 Drawing Sheets

EMBEDDED SYSTEM FOR DIAGNOSTICS AND PROGNOSTICS OF CONDUITS

This application claims the benefit of U.S. Provisional Patent Application Ser. No. 60/236,432 Sep. 28, 2000.

FEDERALLY SPONSORED RESEARCH

This invention was made with Government support under SBIR Contract No. N68335-98-C-0036 awarded by the Naval Air Warfare Center Aircraft Division. The Government has certain rights in the invention.

SEQUENCE LISTING OR PROGRAM

Not Applicable.

FIELD OF THE INVENTION

The present invention relates generally to a method for enhancing safety, reducing failures of systems that carry exclusively or as mixtures electrical, optical, electromagnetic signals, fluids, gases or solids by determining and locating the identity of stress factors (stressors) that cause deterioration and damage affecting the health, status and integrity of conduits and conductive paths, as well as components thereof including cladding, insulating materials, conductors and the signals or media they transport. More particularly it relates to an apparatus with a combination of active and passive components used in-situ for automated inspection periodically or in real time, or during periodic inspection with visual, instruments or automated means to pro-actively identify, measure, diagnose and prognose damage and deterioration as well as the causes thereof.

BACKGROUND OF THE INVENTION

Structures that support transport of diverse electrical and electromagnetic signals, fluids, gases, and solids can be called "conduits". This application uses the term "conduit" for any structure supporting transport that can fail from accumulated damage or deterioration such as a cable, cable bundle, hydraulic or pneumatic hoses, pipes, or fuel lines. Conduits and conduit components deteriorate over time and are frequently damaged due to stress factors called "Stressors" including but not limited to abrasion, vibration, stresses, strains, chemicals, and heat) that exist both without and within conduits. If left undetected and allowed to take its course, the damage caused by stressors can cause damage of said components grounding, shorting, leaks of substances carried in the conduits. The damage can occur in moments or take an extended period of time. Often the failure happens unexpectedly, before a system's operator knows of the problem.

In practice, conduits are usually encased by an insulating material and sometimes sheathed with one or more layers of cladding to assure continued functionality and safety. In certain situations it is important to know the degree of risk and status of health and integrity of conduits, contained conductors, and related components that comprise them. Conduits and systems of conduits may carry electrical power, fuel, other fluids, pneumatics, optical or electromagnetic signals. Deterioration and damage to cladding and insulation can be, and often is, a precursor to a failure in a system. Damages to interconnection systems includes, but are not limited to, chafing due to vibration, corrosion due to caustic chemicals, incisions, due to sharp edges, stress and strain due to motion, burning, oxidation, reduction and other chemical reactions, as well as chemical and physical degradation due to aging.

We focus now on aircraft wiring as conduits, although the following statements have broad application in other uses for conduits of other types in other applications. In older fly-by-cable aircraft, chafed, cut electrical harnesses, control cables and hydraulic conduits used to control flight surfaces, landing gear, fuel supplies and engines have been known to cause loss of control of the aircraft and fatal crashes as in the American Airlines DC-10 crash at O'Hare Airport on May 25, 1979, in the report of the National Transportation Safety Board, a non patent document cited as reference #1. In current fly-by-electric aircraft damaged electrical wiring with exposed conductors are known to result in electrical shorts resulting in numerous instances of fire, crashes and fatality. For example, damage to or deterioration of electrical conduits has been implicated as root cause of failure in a report by the Canadian Civil Aviation Authority as a probable cause the Swissair flight 111 MD-80, a non patent document cited as reference #2. Deterioration of electrical wiring is cited as a probable cause of the explosion in the center fuel tank of TWA flight 800 Boeing747 in the report of the National Transportation Safety Board, a non patent document cited as reference #3. A similar situation exists with fiber optic conduits being used in emerging fly-by-light aircraft control systems.

Severe chafing can cause exposure or damage to the conduit or that which is causing the chafe. In either case the results can be catastrophic as witnessed by the report of the NTSB investigation of the crash of a V-22 aircraft in 2000, a non patent document cited as reference #4. In this instance the cause of the crash was attributed to chafing by electrical conduits resulting in chafe through of a titanium hydraulic conduit releasing its contents.

By law, or decision in recognition of sufficient risk, conduits are usually required to have reactive safety devices such as electrical circuit breakers, temperature and pressure sensors, and relief valves as the means to protect against hazards. In many cases visual and intrusive inspections are used to assure functionality and safety. However, recent studies of intrusive inspections indicate that the procedures can do more harm than good by disturbing and damaging otherwise healthy materials. A recent investigation and report released in June 2001 by the US Federal Aviation Administration Aging Transport Systems Rulemaking Advisory Committee published in 2000, a non patent document cited as reference #5, found that careless intrusive inspections can be a significant risk of causing damage to aircraft wiring.

Damage to aircraft conduits is known to cause catastrophic failure due to loss of signals to control systems, loss of hydraulic fluid, and other situations. Even when control systems remain intact toxic fumes, and dense toxic smoke from smoldering or fire can make it impossible for a pilot to safely fly the aircraft. Intense heat from burning aromatic polyimide electrical wiring insulation and other combustibles can melt other insulation in seconds leading to collateral damage, more shorts and further loss of control. As a result commercial aircraft are now required to have smoke detector alarms. Soon they are expected to incorporate apparatus disclosed in patents by Haun et al and Fleege et al called arc fault circuit breakers that act to interrupt in real time on detection of arcing electrical faults, but it may be too late to avert disaster.

Considering the extreme safety hazards of loss of control, toxic fumes, toxic smoke, fires or fuel tank explosions of aircraft it is not only important to know that deterioration or damage such chafing, arcing, or cut wires has occurred but also that a situation exists that likely will cause it to happen during flight. It would be very desirable therefore to have an advance warning or corrective action initiated by an in-line or in-situ passive means for the purpose of detecting evidence of significant causes of deterioration, damage and failure of conduits as well as the degree of ongoing deterioration and damage. It would be even more desirable if electricity was not the means of detection of said ongoing deterioration and damage.

A patent disclosure for a device for the said purposes was not evidenced during our year 2001 searches of patent databases.

DISCUSSION OF PRIOR ART

Our search of patent databases discovered over one hundred patents that deal with detection of faults in electrical signals, detection of damage and deterioration in electrical conductors and likewise in electrical insulation, along with patents of similar nature applied to deterioration and damage of pipelines, fiber optic networks and other conduits.

DISCUSSION OF LIMITATIONS OF PRIOR ART

The following discussion presents limitations of prior art, or those aspects not covered by prior art that are addressed by the present invention. For brevity, only the most significant limitations of each category of prior art are included.

Currently nothing is in wide use that combines detection of stressors, detection and diagnosis of damage to a conduit in progress, and prognosis of risk of conduit failure and system failure. The disclosure of U.S. Pat. No. 4,988,949 by Boenning et al is limited to detecting mechanical damage (chafing) on electrical cables against grounded structures under constant monitoring. The disclosure of U.S. Pat. No. 6,265,880 by Born et al discloses use of a length of electrical conducting media (such as a wire) along the outside of a conduit to detect mechanical damage (chafing), and improves on said Boenning's patent by teaching periodic testing, and detecting chafing on conduits other than electrical cables, and detecting chafing against a non-electrically grounded structure.

Watkins patent U.S. Pat. No. 5,862,030 teaches an electrical safety device comprised of a sensor strip disposed in the insulation of a wire or in the insulation of a sheath enclosing a bundle of electrical conductors, where the sensor strip comprises a distributed conductive over-temperature sensing portion comprising an electrically conductive polymer having a positive temperature coefficient of resistivity which increases with temperature sufficient to result in a switching temperature. Said Watkins' patent also teaches use of electricity with a mechanical damage (chafing) sensing portion comprised of a strip disposed in the sheath in a mechanical damage sensing pattern which like said Born's patent becomes damaged or open upon mechanical damage of the sheath before the bundle of conductors are damaged. Watkins' patent does not teach a means to perform detection of mechanical damage without use of an electrically conductive sensor material.

Currently nothing is in wide use to detect, measure and diagnose onset of damage by simultaneous stressors. Currently nothing is in wide use detect and diagnose damage to conduits with mixed conductors such as electrical power, electrical signal, and optical signal conductors in a single bundle. Use of uncontained electrical signals is often dangerous and hazardous especially when conduits carry flammable or explosive matter, yet currently nothing is in wide use that enables detection of chafing or other damage by non-electrical means. Currently nothing is in wide use that diagnoses the likely stressor, or estimates the likely risk and progress of damage and future damage, or predicts the remaining useful life of a conduit. Currently nothing is in wide use that operates in-situ, on or in the conduit, in a timely fashion to warn and possibly pre-empt catastrophic damage that would otherwise occur.

Thus there exists a need for a means to detect and identify multiple types of stressors, to quickly measure and interpret multiple types of damage including but not limited to mechanical damage (chafing), all prior to any damage to the internal structure of a conduit or to systems in the vicinity of the conduit. Further there exists a need for a method to combine and fuse information of type and amount of damage with identity of stressors and rate of damage to estimate in a timely fashion the risks of future damage. Further there exists a need for a means to mark multiple points of damage to aid in repair and remediation.

Prior art disclose techniques with real time signal processing to detect intermittent arcing to ground, series arcs and parallel arcs in electrical wiring due to brief wiring shorts. Fleege et al, U.S. Pat. No. 6,242,993 and Haun et al U.S. Pat. No. 6,246,556 use an electrical circuit and signal processing algorithms as part of an "arc fault detecting electrical circuit breaker" to identify arcing faults but cannot locate the place where the arc fault occur. Baldwin et al U.S. Pat. No. 6,249,230 discloses a ground fault detection system and ground fault detector to identify, but not locate the place of, ground faults. These patents dealing with arc and ground faults have limitation because they do not assist detection before the problem occurs and does not assist repairmen in locating the place of where the problem occurs in order to correct the situation and any damage caused. The present invention overcomes limitations of the said arc and ground fault circuit breakers for three reasons. First, the present invention detects conditions prior to when faults occur. Second, the present invention does not require signal processing algorithms, signal digitizer or signal processor to accomplish detecting intermittent faults by using sensed evidence of damage to the sensitized strands at the point of the fault. Third, the location of the intermittent fault can be determined by the marking or by other means such as reflectometry on a damaged strand capable of supporting electromagnetic waves, or measurement of the amount of light contained in the damaged strand of a fluorescent-doped fiber compared to previously measured level of light in the fiber before damage.

For short exposed distances, some emerging methods and apparatus provide inspection with automated measuring instruments employing means such as digital processing of images made with ionizing radiation, ultrasound, heat, and radar presented at the 2000 Aging Aircraft Symposium in St. Louis Mo., referenced as non-patent document #6. Such methods have limitations due to the subjective nature of reading the images, distance from the conduit, and masking caused by structural members and clamps attached to conduits. Such methods require removing such impediments, focusing on and changing proximity to the impediments, or other intrusive means, and this action can lead to damage where none existed before. More importantly the procedure to detect tiny yet important damage in images other than made by x-ray is invasive requiring rotation to obtain 360-degree inspection. When the size of the conductors are smaller than 16 gage such invasive practice is well known to cause damage by twisting and disturbing the conduits, especially when the conduits are embrittled with age. The present invention overcomes said limitations by operating at the surface of the conduit, providing direct evidence.

Born, et al U.S. Pat. No. 6,275,050 teaches use of a harmonic analysis to detect corrosion in metal junctions. Use of harmonic analysis as described by Born requires using at least one electrical signal. The present invention overcomes limitations of said Bond's patent teaching by not requiring use of any electrically condutive sensor material. Removing the use of electrical conductive sensors and thus electrical signals for inspection are important because electricity can be a safety concern, especially in fire or explosion prone situations that could be caused by electrical signals. The present invention overcomes limitations of said Bond's patent teaching of end-to-end measurement of light transmitted using a fiber optic cable by a method that operates without requiring end-to-end measurement.

Khuri-Yakub's U.S. Pat. No. 5,271,274 (1993) teaches use of acoustic waves through a film on a substrate, with processing of the output signal to give a thickness value. Khuri-Yakub's patent does not teach use of measurement of optical phenomena such as amount of luminesence. The present invention does not use and overcomes limitations of the said Khuri-Yakub's patent by teaching use of measurement of optical phenomena. The present invention eliminates the need for acoustic processing thus reducing cost and weight for an acoustic processor.

Morris, Jr., et al, U.S. Pat. No. 6,512,444 teaches use of a fault sensing wire that utilizes one or more sensor strips which provide an electrical impedance change when heated. Morris's patent does not teach a means for fault sensing using measuring optical properties. Morris's patent does not teach a means for locating the point of the fault. The present invention overcomes limitations of the said Morris's patent by using light parameter measurement. The present invention eliminates use of electricity which can be a safety hazard; and simplifies the design, which reduces cost and weight and potentially reduces the time for installation. The present invention improves over Morris' methods by substituting measurement of luminescence, fluorescence or other optical phenomena for electrical impedance measurement which would eliminate the use of electrical measurement which can be a safety concern, especially in a fire or explosion prone environment. The present invention further overcomes a limitation of Morris's patent requiring a microcontroller because the present invention also can be embodied without the need for a microcontroller by using direct measurement or analog processing. Eliminating the need for Morris's microcontroller and programming thereof which can result in significant cost savings which is important to the end user.

Johnson's U.S. Pat. No. 5,712,934 discloses an optical sensor comprising a light source, light detector and signal generator and an optical fiber extending between the light source and the detector. Said Johnson's patent does not teach use of induced optical phenomena such as by adding a light-emitting doping in the fiber or its cladding to create enhanced light to perform detection of chemical, mechanical or other damage; nor does Johnson teach the use of a single ended measurement device with a light source and a light detector. The present invention overcomes the need for Johnson's end-to-end measurement of light by using the innovation of measuring change in the amount of lumenscent flux caused by a single ended test, such as ultraviolet rays focused on a the open end of a strand doped with a material that fluoresces under ultraviolet rays.

De Angelis's U.S. Pat. No. 6,392,551 teaches a synthetic fiber cable made with a bundle of load bearing synthetic material fibers and at least one electrically conductive temperature sensor element extending the a length of the cable. The temperature sensor element forms, in dependence on the temperature a conductive connection over the length of the cable, which connection is constantly monitored by a measurement circuit. The present invention improves on said De Angelis's patent by not requiring an electrically conductive element which can be a safety concern especially in a fire or explosion prone environment. Further, the present invention improves on said De Angelis's patent by using a very thin light conducting polymer strand which saves weight over metal strands, weight being a significant advantage for some end uses.

May's U.S. Pat. No. 6,286,557 discloses a sheath having an electrically conductive portion extending from an inner surface to an outer surface. May's patent does not teach how to create a sheath that uses measurement of parameters of Optical Phenomena. The present invention overcomes limitations of the said May's patent by using measurement of Optical Phenomena parameters. The present invention improves on said May's patent because it eliminates the need for electrically end-to-end conductive sensors by introducing use of micro-optical fibers, thus saving weight which can be a significant advantage for some end uses.

Runner's U.S. Pat. No. 5,245,293 describes a method and apparatus for detecting changes in structural strength of a bonding joint using measurement of dielectric properties such as electrical resistance and capacitance. Runner's patent does not teach how to use measurement of optical parameters for detecting changes in structural strength of a bonding joint. The present invention overcomes limitations of the said Runner's patent by using measurement of optical parameters. The present invention improves on said Runner's patent by substituting single-ended measurement with light for end-to-end electrical measurement which would eliminate the use of electrical measurement of dielectric properties which can be a safety hazard especially in fire or explosion prone environments.

The disclosures of U.S. Pat. No. 6,937,944, and continuing U.S. Pat. No. 6,868,357 by Furse teach detecting damage to a metal conductor by use of a processor which performs frequency domain Fast Fourier Transforms of high frequency electrical signals. The present invention, in the preferred embodiment, improves on Furse by eliminating the need for a high radio frequency signal generator and the electrical signals it creates which can be a safety concern thereby reducing cost and weight and potentially reducing the time for installation.

OBJECTS AND ADVANTAGES

The current invention is a method for determining the health status of conduit components, conduit sections, and systems that utilize conduits. Briefly stated, the method is comprised of the steps of: determining the requirements for monitoring the system of conduits; defining the functions of the distributed computers, diagnostic and prognostic software to meet the requirements; selecting the parameters to be sensed and monitored; selecting the components consisting of electronics, hardware, software, firmware and set of discrete sensors and strips of sensitized medium to implement the functions; designing and manufacturing the form and fit of the monitoring device comprised of said components; applying, placing, attaching or embedding the monitoring apparatus in a conduit; and placing the discrete sensors and strands of sensitized medium along the length of said conduit. The purpose of the discrete sensors is to measure characteristic parameters of the conduits and stress causing factors. The said strands of sensitized medium, each having a first end and a second end, being placed such that damage inducing factors such as an a solid object, gas, liquid, powder or electromagnetic waves contacts said medium prior to contacting said conduit. The combination of discrete sensors and strands of sensitized medium provide a means for determining by a combination of measurement and deductive algorithms whether, when and where and to what extent said damage inducing factors have damaged each of said multiplicity of sensitized medium. Algorithms of a monitoring application use the said determinations along with other a-priori data to infer damage or pending damage to conduit components, conduit sections, and systems of conduits.

Therefore, one object of the present invention is to combine detection of onset of damage by a wide variety of stressors, and perform diagnosis and prognosis of damage to a conduit before damage to the conduit occurs.

Another object is to provide a method to deduct the identity of active stressors.

Another object is to provide a means to locate places where damage has occurred and coincidentally locate a place on the stressor as well.

Another object is to provide a means to diagnose damage, to predict future damage, and to prognose risk of conduit failure and system failure.

Another object is to provide a means to sense and locate damage that does not depend on electricity to excite sensor material or read the sensor.

A final object is to provide a means and method that operates on or in the conduit, in a timely fashion to warn of damage in progress and possibly pre-empt catastrophic damage that would otherwise occur.

Accordingly, besides the objects and advantages described above paragraphs several objects and advantages of the present invention are:

(a) to provide a means for unattended surveillance and real time inspection of conduits;

(b) to provide a method to identify the probable cause of and estimate the location the points of damage so as to facilitate remedial action;

(c) to provide a means to be pro-active by enabling and providing for early detection, identification, and location of external and internal stressors that left unattended will lead to damage of components of the conduit disrupting the system the conduit services.

Patent searches in preparation of this application have not found prior art that provides a means for enabling real time automated probabilistic identification of the cause. Said searches also have not found prior art that provides a means for automatically and in real time marking of surface at points damage as a means for assisting in remediation and repair thereof. Said searches have not found prior art that utilize combinations of coated, hollow, filled, doped fibers and otherwise sensitized strands as a means for detecting and identifying stressors or detecting and locating damage to the conduit insulation and by implication the conductor therein.

There is an important and significant advantage in using data from measurements of characteristic parameters of strands of sensitized medium, and in particular strands that detect damage without the use of electrical excitation or interrogation. Individually, the purpose of the sensitized strands constructed in the manner of the present invention detect and provide data on damage and condition s that could lead to damage, such as ingress of fluids.

There are important and significant advantages to employing the invention such as the ability to determine that damage to the sensitized media is taking place that infers or current damage to the insulation and eventually damage to the conducting core. In the case of electrical conduits, or conduits of dangerous chemicals, such damage detected early could mean the difference between life and death. As a minimum the invention has the advantage to implement condition based maintenance which is a procedure of choice in maintaining important systems such as pipelines, conduits, electrical systems, communication systems, data systems and other uses of conduits hi any event, there is the advantage of having the ability to accurately detect, locate and infer the presence of the damaging stressors that will be of use to the inspector or repair person. This will be of particular advantage to inspectors and maintainers when the system of conduits is not easily inspected, perhaps hidden inside a wall, buried underground, in space systems, aircraft and undersea. The advantages are not limited to situations involving the conductive core and extend to the insulation material and other protection devices. An example of such an advantage is found in aircraft wiring systems where insulation is made from aromatic polyimide called Kapton which is known to explode and cause fires when the insulation degrades over time to form carbide molecules which release flammable acetylene gas when wet.

It is an advantage that the present invention can be implemented with an integral microcontroller for real time in-situ sensitized medium and sensor management, data processing, and communications.

It is an advantage of the present invention that it can be so constructed in other embodiments without a microcontroller and signal generators in a manner that facilitates attachment of the microcontroller or other suitable processor, signal generators and ancillary electronics during manual inspections without disassembly of the conduit.

It is an advantage of the present invention that it can be configured within the surface of a conduit or it can be placed on or can be sleeved over the conduit surfaces. The present invention thus enhances and protects the existing insulating and protecting material while providing enhancements to current visual inspection techniques and also to inspection using non-visual measurement systems during operations, inspections, tests, and repairs. When embodied in or added to an interconnection system, system of conduits or pipeline, the invention provides a means for ready and accurate determination of the presence, cause, location, degree of stress and degree of damage by a variety of commercially available fibers, measurement devices and instruments.

The present invention has the advantage to provide inspectors with a means to remotely locate and measure stressors and assess damage by stressors in accessible and inaccessible areas.

The present invention has the ability to detect onset of damage to the insulator and its protective coating, if any. This is a definite advantage over finding after the fact an electrical fault in the conduit.

It is an advantage of the present invention that safety risks are avoided because the present invention enables use of light, sound, microwaves, pressure and other non-electrical means to sense, locate and determine causes of damage avoiding the safety risks inherent in using electricity.

SUMMARY OF THE INVENTION

Briefly stated, the present invention is a method to detect multiple forms of damage to a conduit and perform diagnosis, prognosis related to condition and remaining useful life of said conduit, thereby reducing the chance of failure of any system that would be damaged or whose function would be impaired by damage to the conduit. Such a system could carry electrical power, optical or electromechanical signals, fuel or other fluids, may be hydraulic or pneumatic, or may carry solids such as particles.

Throughout this application "sensor" is synonymous with "sensitized strand". Throughout this application there are terms which relate to measurement of natural phenomena that are known to be caused or induced by a number of factors including photons, heat, chemical reactions, fractures, ionizing radiation, and electricity. In particular, the present invention focuses on optical phenomena which fall into two general categories. The first category is rays of light or flux generated through excitation by photons, mechanical, or chemical means resulting in phenomena widely known as phosphorescence, luminescence, and incandescence. The second category is distortion or blockage, or amplification, or other change to rays of light caused by mechanical means such filtering, splitting, polarization, refraction, reflection and absorption of rays of light. Optical phenomena in the context of the present patent include:

Incandescence: light emission due to temperature (e.g. light bulbs).

Luminescence (Scintillation): light emission due to causes other than temperature. These causes could be electromagnetic radiation, electric fields, chemical reactions, bombardment by sub-atomic particles, or mechanical action. If the sub-atomic particle is an electron, it is called cathodeluminescence. If the mechanical action is breakage or shattering, it is called triboluminescence. If one form of luminescence induces another, it is called "luminescence luminescence".

Fluorescence: luminescence that ceases within ten (10) nanoseconds after the stimulus has ceased.

Phosphorescence: luminescence that continues for more than ten (10) nanoseconds after the stimulus has ceased.

The present invention is a method that is constructed with a microcontroller or other computer connected optically or electrically or mechanically to a combination of a set of discrete sensors and a multiplicity of strands of sensitized media placed on, into, or woven as a sheath substantially surrounding, a conduit and that when attached to, sleeved over, or embedded into said conduit provides a means whereby to collect data to detect, locate, and reason the existence, cause and degree of stress or damage to the sensitized medium themselves and by programs and algorithms in the microcontroller or other computer to sense, detect, locate and reason risk of damage of the conduit.

Throughout this application the term strands mean elongated forms of substances such as strips, fibers, tubes, filaments of diverse materials and dimensions with excitable strands in this context are those strands that can carry signals. Non-excitable strands in this context are strands that are not intended or not conditioned to carry signals and serve another purpose like a marker strand and said strands can be entirely selected of optical, electrically opaque medium sensitized with coatings, claddings, and non-metallic materials so as to eliminate any possibility of electrification of the strands.

Damage caused by external stressors including, but not limited to, corrosive chemicals, heat, structures, and maintenance actions is detected by wrapping the conduit with a set of strands of sensitized medium such as treated, clad, or coated hollow or solid fibers. The sensing elements are positioned so that damage caused by a stressor breaks, erodes, corrodes, punctures or breaks one or more of the sensing elements. Measuring the end to end integrity of still measurable sensing elements or performing other tests on them determines whether each has failed, thereby indicating that the conduit's integrity will be compromised unless remedial action is taken.

According to one embodiment of the invention, a method for detecting damage of a conduit comprises steps of placing adjacent the conduit surface an effective length of a pattern of sensitized medium being located so that a stressor cannot damage the conduit without substantially damaging a strand of sensitized medium; determining and storing characteristics of the installed apparatus; performing measurements during operation in a periodic or continuous fashion on the sensitized medium; analyzing the measurements; comparing the measurements against the stored characteristic measurements; determining damage by examining the integrity of the sensitized medium or other processing; deducing the likely identity of the stressors; diagnosing the meaning of the damage with respect to the conduit; predicting the degree and intensity of the expected damage to the conduit, prognosing the remaining useful life of the conduit without remediation; updating the algorithms and parameters; taking any programmed actions such as if isolating damaged stressors, sensitized medium; and as programmed messaging the status of damage, integrity and remaining useful life for awareness by the operators of the system.

In its current status of development, the technology of the present invention is being first manufactured for aircraft wiring systems with flight-testing in 2002. A major advantage of the present invention is that it has a three-tier hierarchy of a central processor linked to local processors called sector managers and processors in the apparatus attached to the conduits. This hierarchy is implemented utilizing advanced artificial intelligence algorithms for pattern recognition, machine learning and other techniques to use probability and statistics for highly accurate diagnostics and prognostics. The current implementation incorporates mechanisms and algorithms for artificial intelligence to learn causal factors, and learn the effects of damage from experience dealing with past instances of damage and repair.

BRIEF DESCRIPTION OF DRAWINGS

The novel aspects of this invention are set forth with particularity in the appended claims. The invention itself, together with further objects and advantages thereof may be more readily comprehended by reference to the following detailed description of presently preferred embodiments of the invention, taken in conjunction with the accompanying drawings, in which:

FIG. 1A shows diagrammatically the concept of undamaged strands embodied in the manner of the present invention. The figure shows by example one glass strand, one strand coated with noble metal, one strand coated with a base metal and one strand with a core that is made of a substance that fluoresces in ultraviolet light. Again, these sensitized media will be individually selected based on the specific application and operational environment of the conduit. The four medium used throughout FIGS. 1A through 1E are for example only.

FIG. 1B shows diagrammatically the damage to the sensitized strands caused by a substance that is less hard than glass, because the glass is unaffected, but harder than the base metal, noble metal and substance of the marker strand. The affected marker strand indicates the location of the damage by the debris at the location of damage which is very near the damage to the others.

FIG. 1C shows diagrammatically the damage across all four strands, which indicates that the damage likely caused by incision or slicing by a substance harder than glass. Again, the change evidenced by the affected marker strand indicates the location of the damage.

FIG. 1D shows damage to the marking indicator strand only, which indicates the damage is likely caused by certain solvents that are not strong enough to affect the base metals, noble metals or glass but do dissolve the coating of the said marker strand. Collateral information about the composition of said marker strand would provide even more understanding of the cause of damage.

FIG. 1E shows damage to only the base metal, indicating that the stressor is probably a corrosive because no other strand was affected and the noble metal is intact. The marker strand is unaffected, however a marker substance could have been included in the composition of the base metal, or if a hollow strand filled with marker dye were utilized, a mark would be released.

Each figure is diagrammatic to the extent that the inner insulated core [1], insulation protecting the core [2] and sensitized media [3], [4] and [5] are shown as each having no particular material, essentially no thickness, no particular separation distance between materials, and no particular predefined pattern. However, the material, thickness of the said sensitized media and pattern can be selected to provide calibration of the degree of ingress of the damage. For example, a thicker aluminum or corrodible metallic element will withstand more corrosion than a thinner element of the same width and material. For example, a tight pattern of millimeter size elements will reduce chance for not detecting millimeter size damage. FIG. 2B, FIG. 2C, FIG. 3, FIG. 5 and FIG. 6 have diagrammatic points [6] for attaching connections [7] from the signal generators [8] to the coupling [15] is not representative of any particular configuration. Each figure is also diagrammatic with respect to other symbols that represent test signals [9][10][11], damage [12], and microcontroller [13]. The supporting surfaces [16][17][18] have no particular description except as to be not causing cross-talk or other confounding situations. The discrete sensors [19] have no particular sensory capability other than being suitable for use with the microcontroller [13]. Similarly, the debris or leakage [14] has no particular attribute other than having at least one property useful in locating points of damage [12]. The types of sensitized strands [20] [21] [22] [23] are only representative of those compatible with single-ended measurement. Finally, the symbol used for a spool [24] is only for illustrative of a means to apply strands on a supporting medium.

REFERENCE NUMERALS IN DRAWINGS

Figure 1:
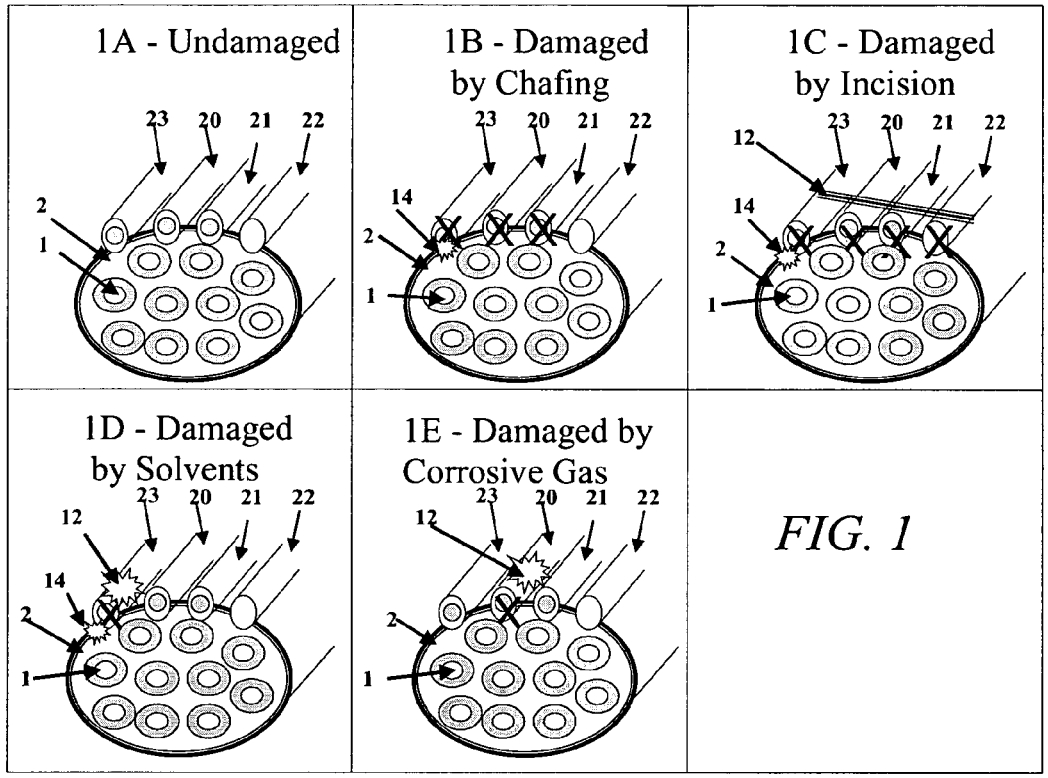
FIG. 1 is diagrammatic view of the technique of the invention and shows how damage to one or more strands of sensitized media employed according to the invention provide the basis not only for accurately locating the place of damage but also provides evidence for reasoning the probable cause of damage. This can be extended by selecting sensitized media constructed in accordance with the invention that are individually or severally affected by stressors. In practice the sensitized media will be individually selected based on the specific application and operation environment of the conduit.
Figure 2:
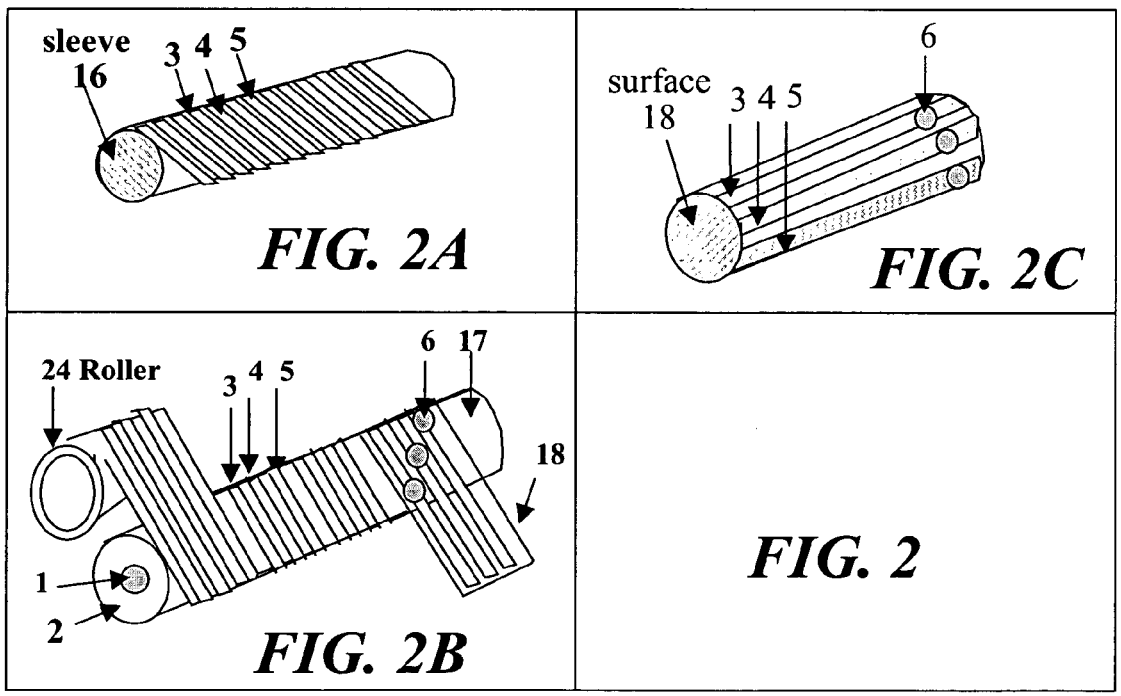
FIG. 2A is a diagrammatic view of the pattern of strands of sensitized media formed on or in a sleeve or tube that can be slid in place over the insulated conduit or bundle of insulated conduits in accordance with this invention. The said sleeve or tube could be slit on the diagonal between any two strands of sensitized media can be easily wrapped around a conduit.
FIG. 2B is a diagrammatic view of the pattern of strands of sensitized media formed, embossed, or otherwise placed in largely parallel fashion on a tape that is wrapped onto the insulated conduit or bundle of insulated conduits in accordance with this invention. Three points of attachment are shown along the insulation, and conductor.
FIG. 2C is a diagrammatic view of the pattern of strands of sensitized media embossed, extruded, or otherwise placed in a co-linear fashion onto the insulation protecting a conduit in accordance with this invention. This could be split horizontally between any two sensitized to be easily wrapped around a conduit.

[1] core conduit to be protected from damage
[2] insulation protecting the core [1]
[3] sensitized media 1
[4] sensitized media 2
[5] sensitized media 3

[6] point of attachment
[7] interconnections
[8] signal generator
[9] signal applied to sensitized media 1
[10] signal applied to sensitized media 2
[11] signal applied to sensitized media 3
[12] damage
[13] microcontroller
[14] debris or leakage
[15] coupling
[16] surface of sleeve supporting sensitized media
[17] surface
[18] supporting surface
[19] discrete sensors
[20] strand with core doped with florescent chemical and plated with base metal
[21] strand, with core doped with florescent chemical and plated with noble metal
[22] strand of solid glass
[23] marker strand
[24] spool
[25] the monitoring applications
[26] data from first tests
[27] baseline characteristics
[28] set of causal models
[29] set of analysis algorithms
[30] set of control algorithms
[31] data from monitoring
[32] determine requirements
[33] define the diagnostic and prognostic functions
[34] select the characteristics to be sensed and monitored
[35] define the appropriate architecture
[36] select a set of discrete sensors and sensitized medium
[37] construct the monitoring devices
[38] develop models
[39] develop the monitoring applications
[40] install the apparatus
[41] perform first test sequence
[42] monitoring
[43] diagnose health states
[44] prognosis
[45] communicating data and knowledge
[46] machine learning
[47] improving models
[48] conduct first test sequence of sensors and sensitized strands
[49] conduct first test sequence of the system of conduits
[50] develop the algorithms
[51] develop control software
[52] integration and testing
[53] initialize for tests
[54] increment the discrete sensor counter
[55] measure discrete sensor data
[56] determine sensor change
[57] choose to repeat sensor test
[58] if last discrete sensor
[59] fuse set of discrete sensor data tuples
[60] increment the strand counter
[61] measure sensitized strand data
[62] determine strand change
[63] choose to repeat strand test
[64] if last strand
[65] fuse set of strand data tuples
[66] record sets of sensor and strand data tuples
[67] generate weighting parameters
[68] data fusion
[69] diagnose health states of sensors and strands
[70] diagnose health states of conduit components
[71] diagnose health states of conduit sections
[72] diagnose health states of system of conduits
[73] decide to locate damage
[74] locate damage
[75] predict damage states
[76] predict effects
[77] predict health states
[78] predict remedial actions
[79] perform inference
[80] compute causal relationships
[81] update causal models
[82] compute new parameter statistics
[83] update model parameters
[84] update the monitoring applications
[85] record data
[86] select a-priori information
[87] process new characteristic information
[88] determine any change from prior characteristics
[89] record characteristics
[90] choose to measure location
[91] measure the location of the change
[92] estimate degree of damage
[93] record health state information

DETAILED DESCRIPTION

In order to achieve the objectives of the above mentioned, the present invention is a method for monitoring a system of conduits for the purpose of determining health states that works by processes that are the means to obtain, baseline and learn from data; the means to learn and fuse data to probabilistically assess causal factors of damage; the means to quantify the state of deterioration and damage that has occurred; the means to assess the risk that a situation exists that likely will soon cause deterioration or damage to happen; and the means to formulate and communicate messages about the health state, deterioration, damage, risks of damage and causal factors.

The current method algorithmically processes data including stressor data and data from a set of discrete sensors and data from a multiplicity of heterogeneous discrete strands of material, each naturally sensitive, or specifically made to be sensitive to stressors or the damage caused thereby by coating, cladding, or doping or other means with at least one media substance specific to a class of anticipated stressor or anticipated damage caused by stressors.

In a preferred embodiment, my method is used with at least one electronic processing device of type called a microcontroller, or an interface to another suitable processor with ability to digitize, process, and perform prestored algorithms of calculus and logic, interface with the said strands; and a multiplicity of sensors for the purpose of collection of data on diverse variables anticipated in the domain of the conduit; and a multiplicity of signal generators, or a multiplexed signal generator at least sufficient for the purpose of exciting the number of strands that are able be excited to obtain data on health, status, condition, and damage to the said strands.

Signal generators in this context are electronic, pneumatic, optical, audio or other signals needed to extract data from excitable strands.

Discrete sensors in this context are devices that serve a purpose to provide data on environmental, internal, physics, etc. and may be located at a distance communicating by wired or wireless means to the microcontrollers.

The said multiplicity of heterogeneous sensitized strands, heterogeneous discrete sensors and microcontrollers serve as a means for sensing, detecting, locating, measuring and messaging in real time about deterioration and damage to sensitized medium, conduits and threats thereto.

In accordance with the present invention the strands of sensitized medium are sensitized so as to provide a means to detect and differentiate causes of damage to a conduit and components thereof or damage occurring in the conduit due to internal factors.

According to conventional design practices, the microcontroller can be constructed in an electrically isolated package and interfaced to only optically conductive sensitized strands using optical decoupling such that light rather than electricity is used to extract data from the strands.

The method of the present invention provides a means to obtain, store and learn from data; the means to learn and fuse data to probabilistically assess causal factors of damage; the means to quantify the state of deterioration and damage that has occurred; the means to assess the risk that a situation exists that likely will soon cause deterioration or damage to happen; and the means to formulate and communicate messages about the state of deterioration, damage, risks of damage and causal factors.

In accordance with the present invention the apparatus is constructed as a layer, sleeve or tape made a multiplicity of said strands of media coated, doped, and otherwise sensitized to anticipated conditions within and external to said conduits, then adding the constructed apparatus as an applique, sheathing, weaving or winding to the outer or inner surface of the conduit.

In accordance with the present invention ancillary electronics that are not an integral part of the apparatus such as personal computers, signal conditioners, used for instruments not included in the apparatus should be selected so as to be able to be readily interfaced to the apparatus.

In accordance with the present invention, the microcontroller and other electronics should be packaged with foresight to prevent damage to itself or other entities.

In accordance with the present invention the substrate, mesh, or surface on which to form, overlay, or attach the strands is selected of suitably inert insulating material.

In accordance with the present invention, when used in communication with a commercially available computer, the data, causal inferences, probabilities and messages generated by the present invention can be used to probabilistically predict future local, system and end effects of faults and failures as well as remedial actions.

In accordance with the present invention, the sensitized medium can be made up of piecewise pieces of heterogenious medium placed layered, side-by-side or end-to-end; each piece, when stimulated, either emitting optical phenomena, or exciting optical phenomena of the sensor or releasing optical phenomena from the sensor; and could be of any size with respect to said supporting surface. Further, the individual patterns can be electrically conductive as long as they do not introduce unintended side effects or electrical conductivity end-to-end for the length of the sensor.

PREFERRED EMBODIMENT

In the preferred embodiment Central Processor is connected by wire or wirelessly to at least one Local Monitoring Device which is connected optically, electrically, or mechanically to a least one strand of sensitized media connected to placed on, into, woven as a sheath substantially surrounding a conduit and that when attached to, sleeved over, or embedded into a conduit provides a means to stimulate and measure Optical Phenomena whereby to detect, locate, and reason the existence, cause and degree of stress or damage to the sensitized medium themselves and by programs and algorithms in a computer to sense, detect, locate and reason risk of damage of the conduit to which they are attached, thereby reducing the chance of failure of any system which would be damaged or whose function would be impaired or degraded by damage to the conduit.

According to one embodiment of the invention, a method for detecting damage of a conduit comprises steps of placing adjacent the conduit surface an effective length of a pattern of sensitized medium being located so that a stressor cannot damage the conduit without substantially damaging a strand of sensitized medium; determining and storing baseline characteristics of the installed apparatus; performing Optical Phenomena measurements (photometrics) during operation in a periodic or continuous fashion on the sensitized medium; analyzing the measurements; comparing the measurements against the stored baseline measurements; determining damage by utilizing artificial intelligence algorithms for pattern recognition, machine learning and other techniques to use probability and statistics for highly accurate diagnostics, or by referencing damage models, or by examining the integrity of the sensitized medium or other processing; using case based reasoning and other logical or inferential reasoning for; deducing the likely identity of the stressors; diagnosing the extent and meaning of the damage to the sensors and by inference and implication damage with respect to the conduit; predicting the degree and intensity of the expected future damage to the conduit; progno sing the remaining useful life of the conduit without remediation; updating the algorithms and parameters; taking any programmed actions such as if isolating damaged stressors, sensitized medium; and messaging the status of damage, integrity and remaining useful life for awareness by the operators of the system.

In any embodiment, simple mathematics are used to condition the output signal and convert the value of the Photometric Measurement to data useable as parameters. Once the photometric, data is obtained, it can be manipulated with statistical algorithms to determine parameters which include the statistical mean, average, mode, and standard deviation. Further, real time differential and integral calculus using analog or digital signal processing techniques can be applied to the photometric data to determine characteristics such as rate of change. Results of combinations of algebraic, statistical and calculus algorithms that have processed the parameters can be used as parameters used by physics of failure models and damage models to interpret the meaning of the characteristic values in context of damage to the individual sensor strands, to the conduits in proximity, and to the system of conduits, and to the functions they provide. A person reasonability familiar with optics, physics and chemistry, experimentation, modeling and simulation as related to the construction and materials used in the sensor strands and conduits will be readily able to use reconstruct an embodiment of the invention for their application.

It is a significant advantage that stimulation of sensitized medium resulting in Optical Phenomena can be used in place of electrical measurements because of the inherent safety it offers.

Another significant advantage of the present invention, is that unlike electrical measurement systems used in prior art, the photometric measurements of the current patent do not need to be used end-to-end. This is accomplished using principles of direct measurement of light emissions; or indirect measurement such as measuring frequency change as a function of temperature of light reflected from a Gallium Arsenide coated surface of chips at a distance from said photometric device. Further, the measurements can be made without making direct contact as the measurements can be made at a standoff distance.

Optical Phenomena directly related to and used in the present invention are phosphorescence, luminescence, and incandescence. These phenomena are light that can be visible or invisible to the naked eye. The output spectrum of the Optical Phenomena determines which wavelengths must be measured. All photometric concepts are based on the concept of a standard measure called a "candle". The ratio of the candlepower of a source to its area is called the luminance of the source. The power of the luminance of the Optical Phenomena of the sensors at a particular frequency or band of frequencies can be measured by several common and widely known techniques. One common and widely known technique is to use a photoresistor or photodetector which are semiconductor devices that convert light signals to a voltage or current. The output voltage or current from the photodector device is integrated, averaged, digitized and otherwise manipulated to provide the measurement parameter.

There are numerous patents for photometric devices. The said devices can be simple in design consisting of a light source selected with a frequency and power to stimulate the phenomena emission from the sensitized medium. An accurate photometric measurement can be made without a calibrating reference signal although said calibrating reference may be worthwhile to remove unwanted variability. The measurements made by the said photometric device may be caused by a specific source in the measurement device or may be from another source such as sunlight, pressures, heat, liquids, electromagnetic fields or other actions on the sensitized matter in the sensor. Depending on accuracy requirements, the measurements can be used "as is" or can be compensated using a calibration transform formula.

Some examples of the technique:

1. a photometric device will measure less power at certain frequencies if pressure significantly crimps or cuts an excited doped phosphorescent plastic sensor strand because a portion of the original light will be cut-off.

2. a photometric device will measure more power at certain frequencies if sunlight appearing through holes in an increasingly corroded surface of a sensor strand excites the luminescent doping inside.

3. a photometric device will measure more power at certain frequencies if a liquid engulfs portions of a non-opaquely coated sensor strand because the liquid will interact and interfere with loss of scattering light from the surface of strand, with reflections re-entering the strand surface.

4. a photometric device will measure more power at certain frequencies if ionizing radiation causes scintillation from atomic decay within an ionizing gas contained structure of the sensor strand or rare earth like Yttrium used to dope the material of the sensor strand.

5. a photometric device will measure less power at certain frequencies if fracturing occurs in an illuminated doped silica core of a sensor strand because the fractures cause a combination of blockage and backscatter.

6. a photometric device will measure changes in power at certain frequencies if fluorescence in a sensor is caused by excitation of a changing field strength of electromagnetic waves.

7. a photometric device will measure increase in power at certain frequencies if fluorescence in a sensor is caused by movement or vibration as witnessed in light generated by chemical light sticks light up when flexed.

Simple mathematics are used to condition the output signal and convert the value to data useable as parameters. A person familiar with measuring light can readily select a photodector or photoresistor that responds best to the wavelength spectrum of the Optical Phenomena of the doping compound used in the sensor. Once the photometric data is obtained, it can be manipulated with statistical algorithms to determine parameters which include the statistical mean, average, mode, and standard deviation. Further, real time differential and integral calculus using analog or digital signal processing techniques can be applied to the photometric data to determine characteristics such as rate of change. Results of combinations of algebraic, statistical and calculus algorithms that have processed the parameters can be used as parameters used by physics of failure models and damage models to interpret the meaning of the characteristic values in context of damage to the individual sensor strands, to the conduits in proximity, and to the system of conduits, and to the functions they provide. A person reasonability familiar with optics, physics and chemistry, experimentation, modeling and simulation as related to the construction and materials used in the sensor strands and conduits will be readily able to use reconstruct an embodiment of the invention for their application.

OTHER EMBODIMENTS

Other embodiments can utilize a manual readout device such as a commercially available personal computer or palm computer. Testing by automated readout can be instrumented in any of several implementations depending on the particular applications by interfacing with the microcontroller [33] by way of its input/output connectors.

Another embodiment (embodiment 1) would be to place sensitized strands atop one another so that when each in turn is damaged the depth of damage is determined. Cross-talk caused by separated adjacent conduits will not generally be a problem because measurements will usually be performed serially. Non-interfering patterns such as one for voltage and one for light waves can be laid touching side by side to avoid even a tiny gap that might lead to having an undetected point of damage. Conflicting conducting patterns such as gold and aluminum which both conduct electricity will need spatial clearance or a suitable spacing material to avoid forming junctions, cross-talk or other confounding situations. The pattern of conducting elements can be applied singularly or en masse as an applique embossed on a non-conducting substrate such as polyamide or a fluoropolymer such as EFTE. Or, the pattern of conducting elements can be extruded or embossed directly onto the insulation surface. Whatever the type of pattern (helical, coaxial, wavy, etc.) is used all distances to a point of damage are also defined.

Figure 9:
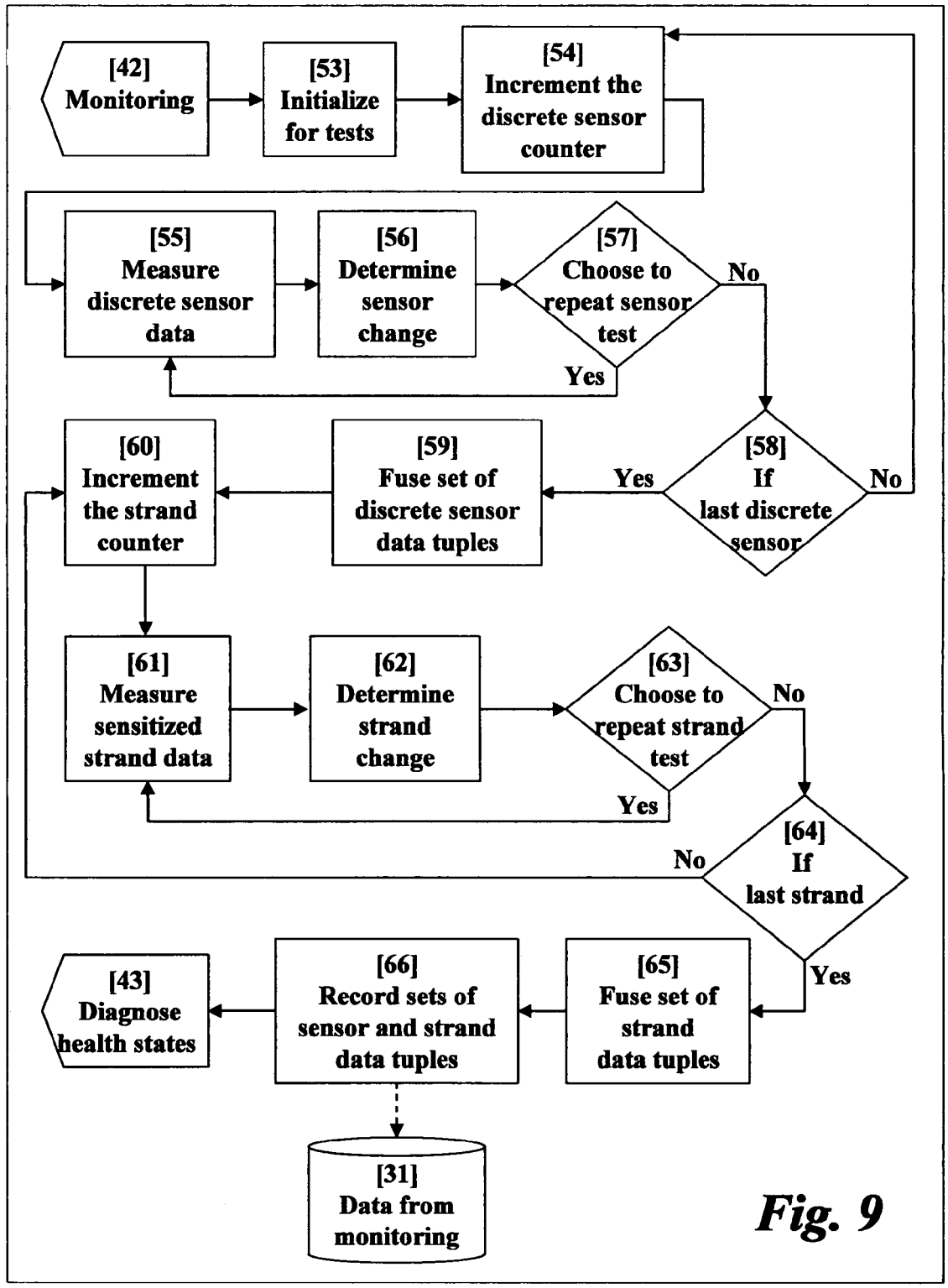

Embodiment 2, shown in FIG. 9 would place two or more rows of sensitized strands among the conductors so that when each in turn is damaged the direction of damage is determined. This also can be used to diagnose that internal damage has begun.

Figure 10:
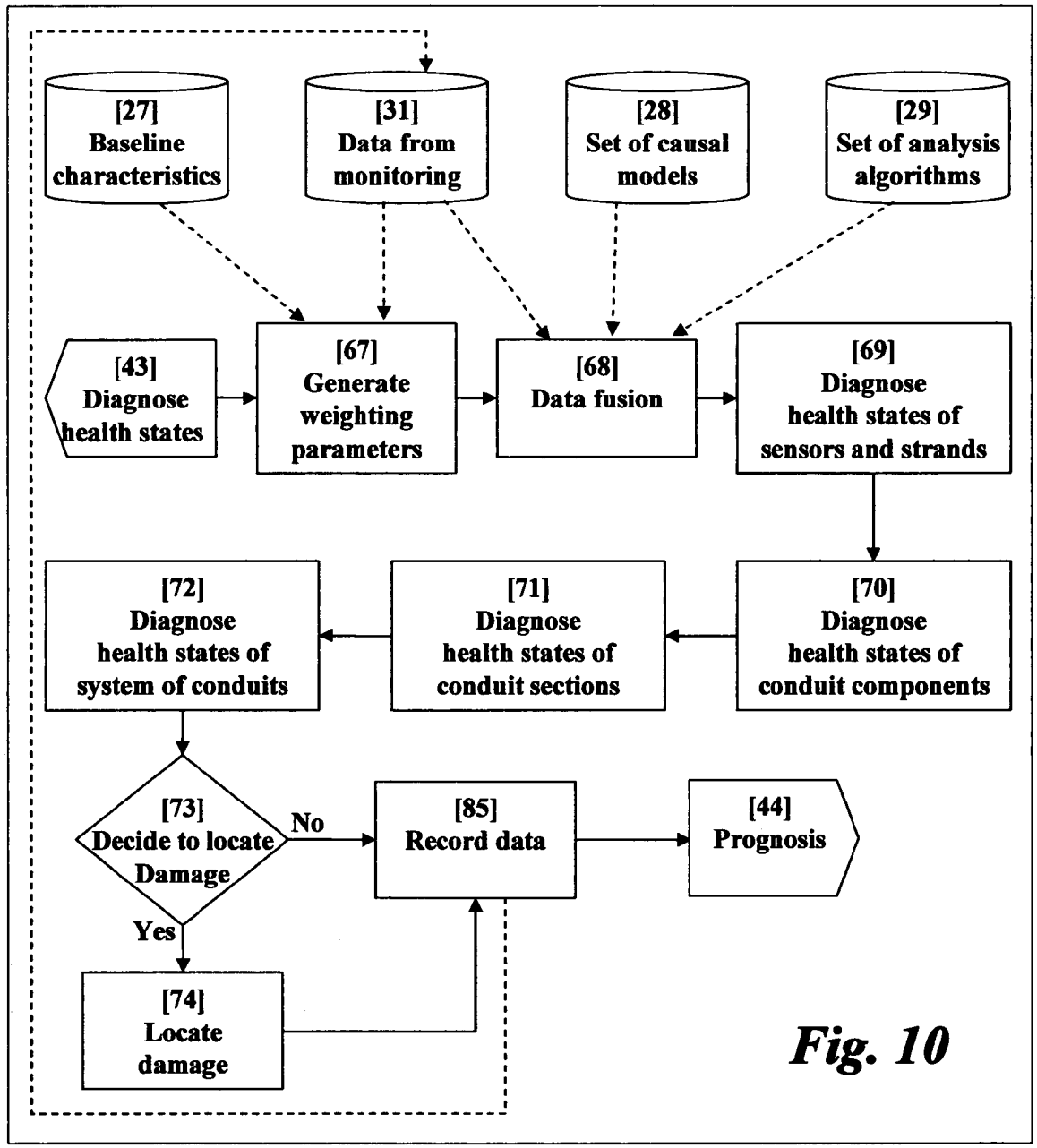

Embodiment 3, shown diagrammatically in FIG. 10 would be to place the sensitized strands in or on the supporting surface [18] that holds the conductors firm. Patterns of sensitized medium can be embedded geometrically on the surface of the medium or in the medium of the sensor strands [27] so as to cause changes in measured Optical Phenomena that is used to diagnose that risk of damage to the conductors has begun.

Figure 11:
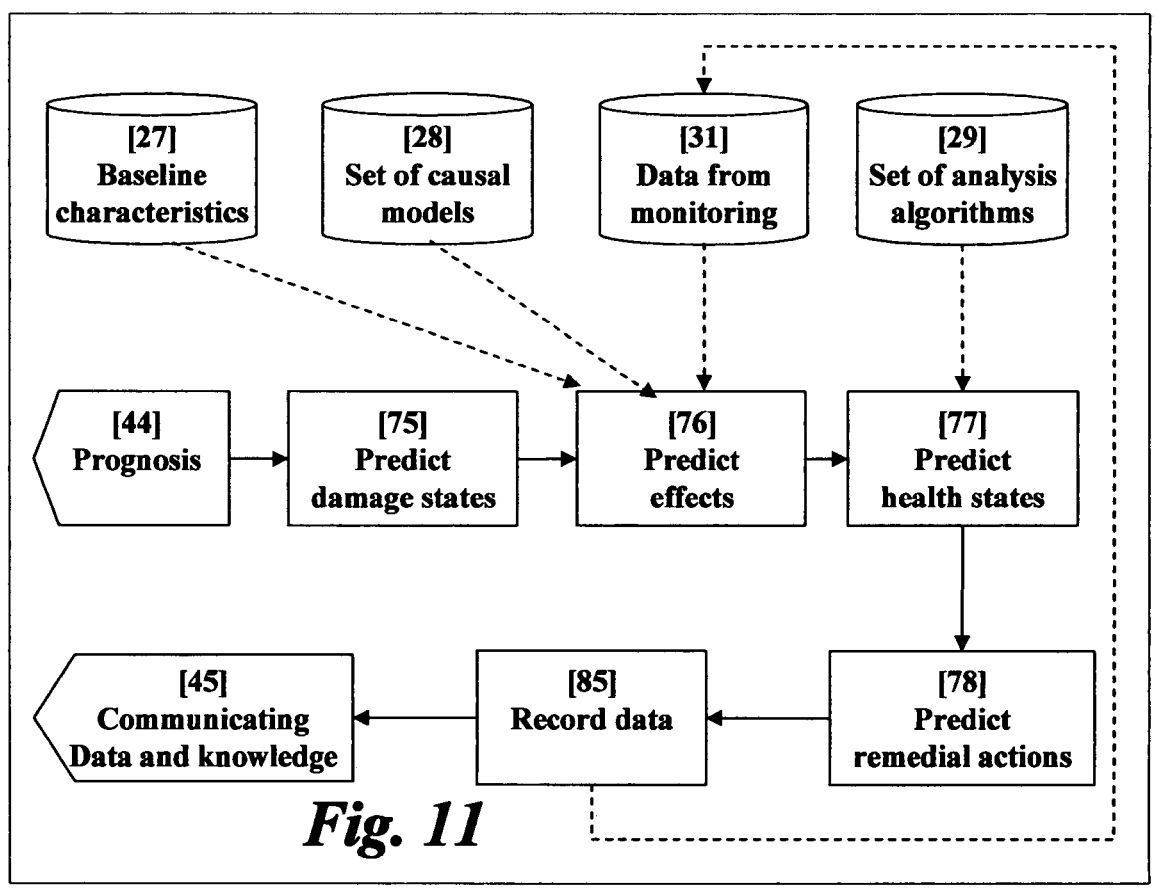

Embodiment 4 is shown diagrammatically in the figures of FIG. 11. Referring now to FIG. 11A which shows how multiple instances of sensitized medium [34] [35] [36] [37] [38] [39] [40] are placed along a sensitized strand. The sensitized strand has an optically conducting core [28] which is made with a medium that may or may not exhibit Optical Phenomena when excited. The said core coated or plated with an optically opaque medium [31] on the surface wherever exposed along the sensitized strand so that the strand is opaque to stimulation of light external to the strand. One end is the point of photometric measurement [29] where Optical Phenomena flux [26] coming from the optically conducting core [28] within the strand.

Referring now to FIG. 11B which shows diagrammatically how one of the sensitized media [38] being damaged allows emission of Optical Phenomena [30] from the surface of the strand, thus reducing the amount of Optical Phenomena flux [26] at the point of photometric measurement [29] thus forming a differential measurement of the Optical Phenomena compared to the undamaged strand of FIG. 11A.

Referring now to FIG. 11C which shows diagrammatically how one of the sensitized media [35] being damaged allows light waves [32] to enter through the damage, said lightwaves increasing the amount of flux [26] at the point of photometric measurement [29], the amount of said increase can be used as an indication as to the extent of damage to sensor.

Referring now to FIG. 11C which shows diagrammatically how one of the sensitized media [35] being damaged allows rays of Optical Phenomena [30] to leave through the damaged surface, said decreasing the amount of flux [26] at certain wavelengths at the point of photometric measurement [29], the amount of said decrease can be used as an indication as to the extent of damage to sensor.

A person familiar with use of electronic computer circuits would understand that in any embodiment, one or more additional couplings [15] with or without a microcontroller or discrete sensors [34] can be attached to the pattern of sensitized media at locations spaced apart from the first coupling [15], so that differential measurements can be taken at the couplings. The additional information from measurements at another point of the branches will accurately resolve any ambiguities caused by a plurality of sensitized media in a branched tree of conduits.

Figure 5:
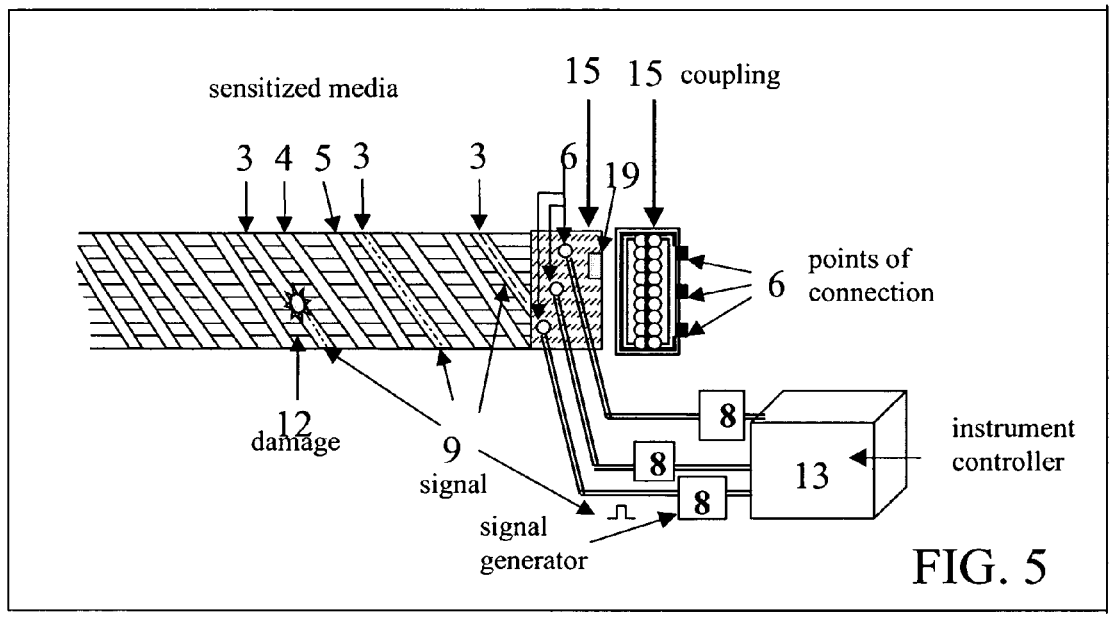
FIG. 5 is a diagrammatic view of embodiment 2 showing a flat, ribbonized, wiring harness with discrete sensors, sensitized media wound and woven in a mesh around its length terminated with a coupling containing the microcontroller, signal generators and other electronics. The figure assumes a self-contained power source or attachment of the microcontroller to a power conductor. Other comments about FIG. 1, FIG. 2, and FIG. 3 apply to this figure as well.
Figure 6:
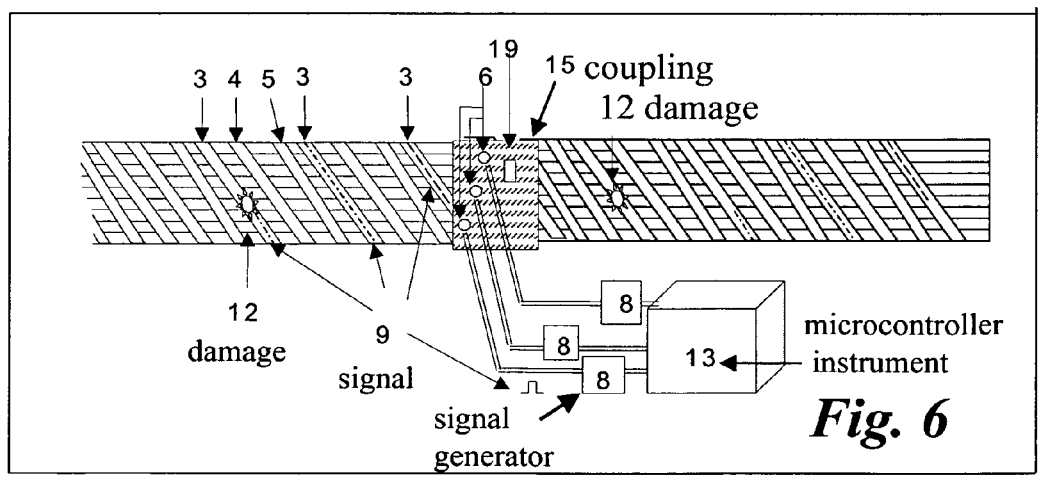
FIG. 6 is diagrammatic view of an alternative embodiment 3 similar to FIG. 5 showing one coupling serving two ribbonized strands with interwoven strands of sensitized medium. Other comments about FIG. 1, FIG. 2, FIG. 3 and FIG. 5 apply to this figure as well.

Embodiment 4 shown in FIG. 6 is similar to alternative embodiment 2 shown in FIG. 5 but with the apparatus now serving two sides, thereby achieving a saving of one Monitoring Device [8] with electronics for sending the excitation signal [9] and Central Processor [13]. As electronics continue to shrink in size the said measurement device could become embedded a conduit.

Figure 7:
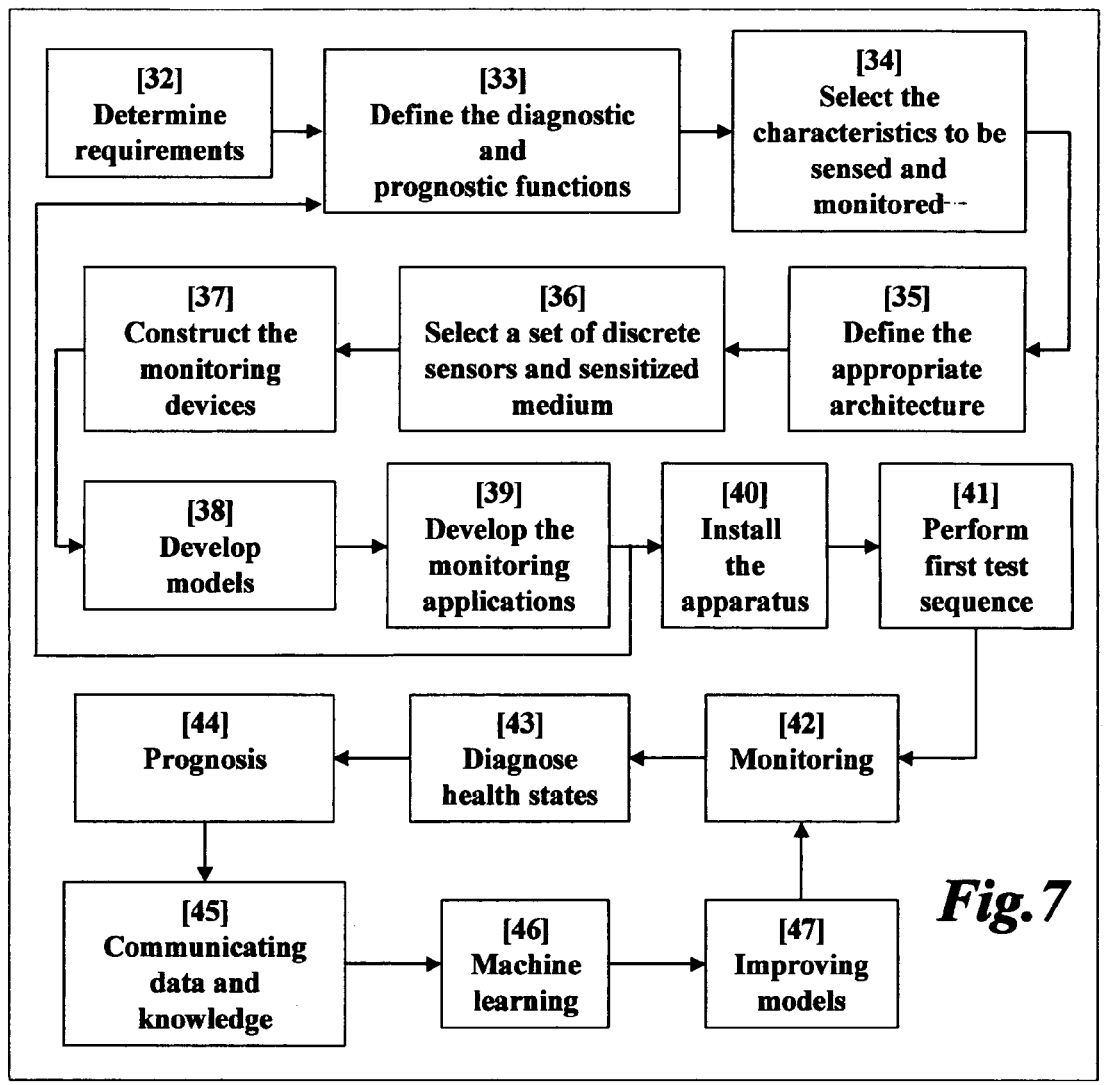
FIG. 7, FIG. 8, FIG. 9, FIG. 10, FIG. 11, FIG. 12, and FIG. 13 are a set of flow diagrams that explain the method of my patent. A person familiar with the construction of flow diagrams would know and understand that each symbol in any flowchart is a brief description of more complex underlying procedures which could encompass thousands of procedures to satisfy a certain intent. Because space available does not permit a single drawing, flow diagrams branch and are more fully described in the other diagrams. A person familiar with the construction of flow diagrams would know and understand that the arrangement of process steps indicated by the symbols can sometimes be relabeled, added, deleted, rearranged, or combined, or otherwise modified to show the level of detail desired.

Embodiment 5 shown in FIG. 7 places sensitized strands among the conductors so that when each in turn is damaged the depth of damage is determined. This also can be used to diagnose that internal damage has begun.

The preferred embodiment involves using the method by installing a monitoring apparatus with a computer, microcontroller or other processor for performing algorithms, the apparatus constructed by connecting a battery, power scavenging capacitor, solar cell array, or other suitable source of power, a wireless commercially available microcontroller such as a Sentient.™. microcontroller, which in turn is connected to a multiplicity of selected commercially available discrete sensors, and a multiplicity of commercially available sensitized strands coated, doped, or clad with specific sensor properties affixed in a largely parallel pattern on a suitable insulating substrate such as a fluoropolymer like EFTE, EFTE-CTFE, FEP, and PFA or mylar or polyimide. The apparatus is either directly attached to a conduit, woven in an insulated mesh, or woven among conductor strands or on an insulating substrate that is subsequently affixed to a conductor or conduit. In service the preferred embodiment is linked by wire or wirelessly to a remote computer such as a commercially available palm, laptop, or desktop model.

The said microcontroller provides the means to collect and process data obtained from the said strands and from said discrete sensors with algorithms to detect and probabilistically determine extent of damage as well as predict future damage and the progression of effects of failures on the system served by the conduit.

The said discrete sensors provide the means to sense local configuration, usage, threat and environmental data. Types of said discrete sensors include, but are not limited to, devices for measuring humidity and temperature and other evidence such as odors from combustion byproducts. The said discrete sensors provide the means to detect deterioration and damage as well as detect factors that would affect the conduit and the service it provides.

The said set of discrete sensors and said multiplicity of strands are selected for each application primarily as a means to provide data about deterioration, damage, or causal factors; and secondarily to provide a means to indicate places where deterioration, damage or threat of damage exists. In a preferred embodiment, all fibers must be nearly of the same diameter, and the strands would be laid out in a measurable pattern that surrounds the conduit such as those shown in the FIG. 1, FIG. 2, FIG. 3, FIG. 5 and FIG. 6. Ideally the pattern strands around the conduit should repeat their pattern in a space of less than one centimeter.

The said multiplicity of strands of sensitized medium, being placed such that damage inducing factors such as an a solid object, gas, liquid, powder or electromagnetic waves contacts said medium prior to contacting said conduit, provide data for determining by a combination of measurement by signal processing and deductive algorithms whether, when and where and to what extent said damage inducing factors have damaged each of said multiplicity of said strands.

The said remote computer is selected for the ability to communicate with the said microcontroller or perhaps indirectly with a system computer that communicates with the said microcontroller by wired or wireless means. Collectively, data from the microcontroller is the means to use artificial intelligence algorithms to make an probabilistic identification of the causes of stress; predict the type of damage being wrought; estimate the degree of damage incurred; estimate the remaining useful life before failure occurs to the conduit. The remote computer provides the means to communicate in real or elapsed time to persons who are at risk, who provide maintenance services, or who otherwise need to be aware of deterioration, damage, or risk thereof to the conduit and the services it provides.

In the preferred embodiment, the said pattern of a multiplicity of strands is connected with the said microcontroller at least at one end. Situations may arise when a microcontroller is required at another end of the conduit. This can be readily accomplished with a wireless, light emitting, or wired commercial technology such as BlueTooth™. In the preferred embodiment the discrete sensors will be placed for maximum effectiveness and if necessary the sensors could be connected to a commercial wireless technology like BlueTooth™. to enable performing functions such as sensing for end-to-end continuity tests.

Referring now to FIG. 1, which shows a diagrammatic views of how damage to one or more sensitized media provides evidence for determining the cause of damage. For illustration, the sensitized media in FIG. 1 comprise a strand of translucent fiber doped with a substance that fluoresces when exposed to ultraviolet, coated with an opaqe piezoelectric material [23]; a strand of optically transparent fiber coated with base metal (e.g. aluminum) [20]; a strand of optically transparent fiber coated with a noble metal (e.g. gold) [21]; and a strand of silica fiber coated with a fluorescent polyimide buffer [22]. The four media [20 to 23] used throughout FIG. 1 are for example only. The five sub-diagrams in FIG. 1 show how evidence from damage to the sensitized media is readily combined to infer the probable cause of damage. Logic combining the temporal order of damage indicated in a test and type of the conductive elements affected with damage can be used to assess the type, degree, and speed of ingress of damage. For example, discontinuity to one material caused by hydraulic fluid would not affect a metallic surface; and damage due to acid corrosion of a metallic surface would not affect a sensitized media made with a a noble metal, a plastic or a polymer. This evidence can be processed with artificial intelligence algorithms such as a Neural Network, Bayesian Belief Network or Boolean Logic truth-table to derive the probable causal factors.

Referring now to FIG. 2A, which shows a pattern of heterogeneous sensitized media [3][4][5] laid linearly in parallel fashion as helices with as small a pitch between media as possible, formed on the outer or inner surface [16]. The surface could be a sleeve or tube made of suitable dielectric or other material suitable for the purpose of separating the sensitized strands. The said pattern of sensitized media could be on the exterior, the interior, or formed as a matrix with the inter-spatial material to form a sleeve or tube. A plurality of sensitized media can be placed on both upper and lower surfaces. The calculation of distance by the sensor instrument algorithm can be used to discern which side or edge of the ribbonized conduits is being damaged. The pattern of sensitized media [3][4][5] can be formed on a sleeve [16] so as to enclose a single conduit or a bundle of conduits. If the sleeve [16] is made of shrinkable material it can be slipped and shrunk over the insulation or itself be made of an insulation. The pattern of sensitized media [3][4][5] can be of diverse materials such as optical strands, metal strands, or organic strands formulated to sense or to act as waveguides or transmission lines. The type of signal is specific to the sensitized media and could be electricity, sound, light, radio frequency, or other signal appropriate to the sensitized media. The arrangement of the strands of sensitized media in patterns can be coaxial or at any angle consistent for measurement of the path to damage conduit (s). The patterns can be touching one another if they are surface compatible such as non-metal media surface touching metal surface media.

Referring now to FIG. 2B, which shows diagrammatically a pattern of sensitized media [3][4][5] formed onto a surface [17] of suitable material such as a dielectric, which is placed onto the insulation protecting the core [2] and/or the conduit core [1]. The surface could be adhesive or other means such as thermal shrinking could be used as the form of attachment. Points of attachment [6] for the leads from the instrument can be positioned if desired anywhere along the said sensitized media. The pattern of sensitized media can be applied in a helical fashion as shown if omni-directional coverage is needed.

Referring now to FIG. 2C which shows diagrammatically an alternative pattern of sensitized media [3][4][5] laid coaxially along a surface [18]. The pattern can be repeated to encircle the insulation for omni-directional coverage. The use of co-linear sensitized media has the advantage that it can be slit to fit over the conduit. The discussion about FIG. 2A applies to this configuration as well.

Figure 3:
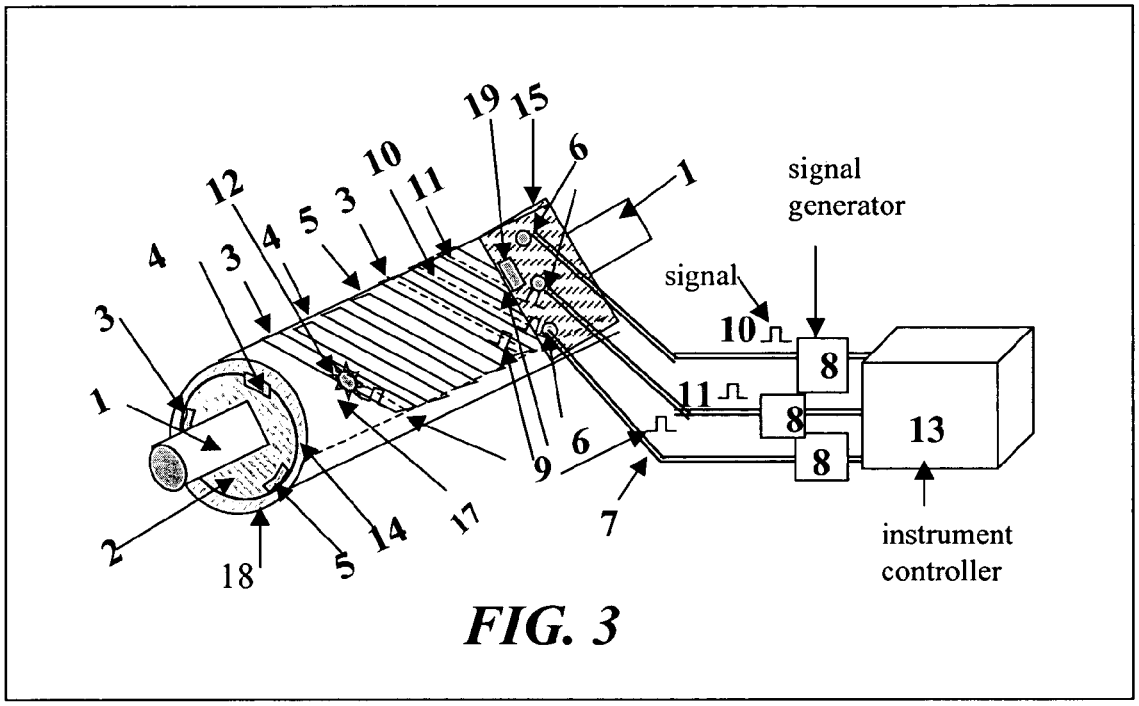
FIG. 3 is a diagrammatic view of a coupling assembly containing a microcontroller with signal generators connected to discrete sensors and to strands of a pattern of sensitized media attached at points to the coupling for the purpose of detecting, locating, and determining the cause, extent and location of damage. The figure assumes a self-contained power source or attachment of the microcontroller to a power conductor.

Referring now to FIG. 3, which shows diagrammatically alternative embodiment number 2, with the microcontroller [13] can be separated from the apparatus yet connected to the arrangement of strands. The microcontroller [13] can be located on a conduit connected to the said conduit, serving both conduits and thereby saving costs such weight, space, and money. FIG. 3 shows a sensored conduit built with discrete sensors [19] and with a pattern of sensitized media [3][4][5] embedded on the inner surface of a sleeve in accordance with this invention is illustrated as applied to an insulation protecting the core [2] surrounding a conduit core [1]. The pattern of different sensitized media [3][4][5] are shown along the length of the insulation in side by side spirals. This embodiment provides initial protection of the plurality of sensitized media so that if ingress of damage due to stressors occurs the various materials are at risk; and as discontinuity of any sensitized media occurs the spatial location of the damage can be measured by reflectometry, signal strength remaining or other remote means. The cause of the damage can be interpreted by algorithms that take into account possible stressors and the damage inflicted to the sensitized media. A preferred embodiment shows a coupling [15] that contains the microcontroller [13] shown in the offset area inside dashed lines as well as a discrete sensor [19]. The coupling is attached to the individual members of the discrete sensor and to the sensitized media with a suitable attachment point [6]. The method of attachment can be any low impedance connection. The attachment points may be of a form such as detents, clamps, holes, posts, or screws, or in the alternative the coupling may be welded or otherwise coupled or permanently fastened to the sensitized media. The coupling itself, which may be of the so-called BNC type, have an outer shell and a center holding a plurality of conduits. The outer shell of a coupling [15] is connected to one or more of the conductive elements such as the sensitized media [4]. An attachment point [6] provides a convenient way to connect the discrete sensors [19] to the microcontroller [13] instrument and connections [7] from the test signal generators [8]. Note damage to the sensitized media [3] causing a point of damage [12]. The distance to the damage can be as short as a few millimeters and at least a few meters. The distance can possibly be as long as several miles for laser signals depending on signal loss in the fiber.

Figure 4:
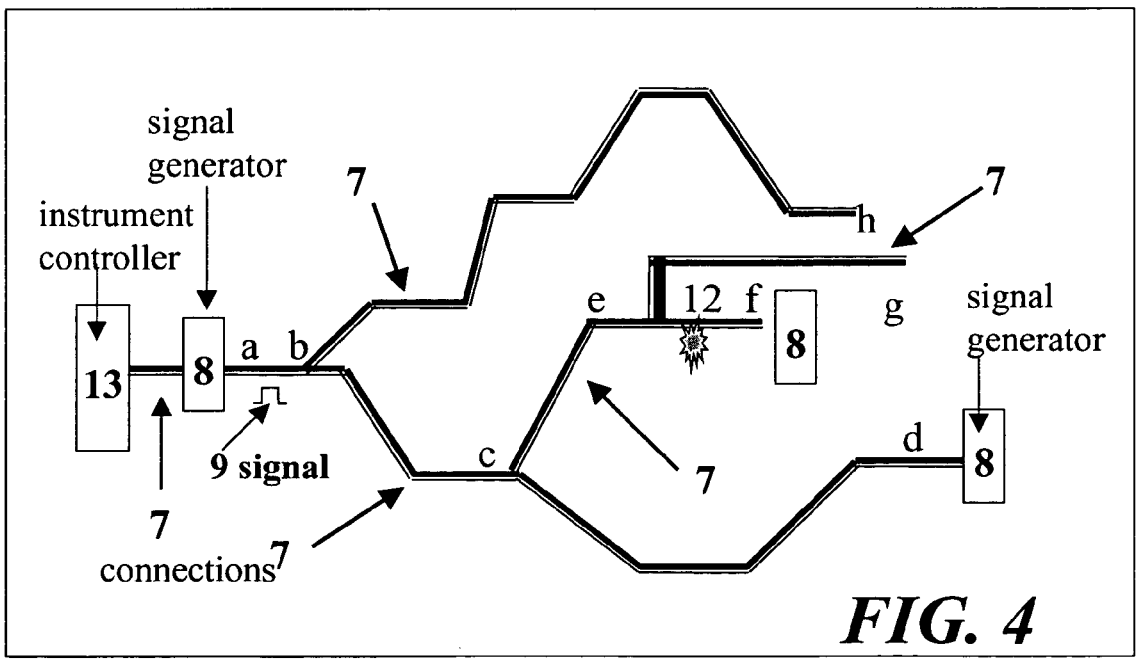
FIG. 4 is a diagrammatic view of a branched insulated conduit tree having outlying sections that when used with the invention can be automatically inspected to measure, locate, reason, and identify the cause and extent of damage in accordance with the invention.

Referring now to FIG. 4 which diagrammatically represents a tree of several connected branches of conduits. To check installation or to perform a test for absence of damage, an end-to-end test can be made using a signal of type appropriate for an element sent from a signal generator [8] and carried along connections [7] to the microcontroller [13]. Depending on the sensory element, the signal can be of various type such as electricity, light, laser, sound, and high frequency waves. Damage [12] on section (e,f) is detected, located and its cause inferred when erosion, corrosion, breakage or other factor causes at least one sensitized media to change a response characteristic such as causing the reflection of the signal to be shorter than before with an abbreviated measured distance to the point of discontinuity caused by damage [12]. In the case of ambiguity caused by the branches, a sensor signal source can be located at another place in the tree to accurately locate the place of damage.

Referring now to FIG. 5, which shows diagrammatically embodiment 2 sensored ribbon sized organized mixed electrical and fiber optic conduit built with a discrete sensor [19] and with a pattern of sensitized media [3][4][5] embedded on the inner surface of a sleeve in accordance with this invention is illustrated as applied to an insulation protecting the core [2] surrounding a conduit core [1]. The pattern of different sensitized media [3][4][5] are shown along the length of the insulation. The statements about FIG. 3 apply. Notice the shape of the coupling housing the electronics shown offset in the dashed space. These electronics could also be attached during inspection if it were not embedded in the coupling [15].

Referring now to FIG. 6, which shows diagrammatically alternative embodiment 3 similar to alternative embodiment 2 shown in FIG. 5 but with the apparatus now serving two sides, thereby achieving a saving of one microprocessor unit and ancillary electronics for the signal generator [8] and the microcontroller [13].

Referring now to FIG. 7, which shows a flow diagram of steps, in a preferred embodiment), to define, construct, integrate, test and use the method to obtain, store and learn from data; the means to learn and fuse data to probabilistically assess causal factors of damage; the means to quantify the state of deterioration and damage that has occurred; the means to assess the risk that a situation exists that likely will soon cause deterioration or damage to happen; and the means to formulate and communicate messages about the state of deterioration, damage, risks of damage and causal factors. The flow diagram shows a series of steps starting with a procedure to determine requirements [32]; followed by steps that define the diagnostic and prognostic functions [33]; select the characteristics to be sensed and monitored [34], define the appropriate architecture [35]; define a set of discrete sensors and sensitized medium [36]; construct the monitoring devices [37]; develop models [38] that are used during monitoring; develop the monitoring applications [39] until is ready to use. When the monitoring applications are read y to use the flow diagram continues with the steps: install the monitoring apparatus [40]; perform first test sequence [41]; monitoring [42]; diagnosing health states [43]; prognosis [44]; communicating data and knowledge [45]; machine learning [46]; and improving models [47]. In a preferred embodiment, the current method incorporates algorithms that take into account factors such as operating domain and environmental factors that might affect a sensor response. Inference algorithms are those that use prior knowledge of data and/or causal relationships to infer states from data such as from a set of discrete sensors and strands made with sensitized strands. Said strands and said discrete sensors will be individually selected and sited based on the specific parameters they provide in the application and operation environment of the conduit and how damage to one or more sensitized media provides evidence for determining the cause of damage.

Figure 8:
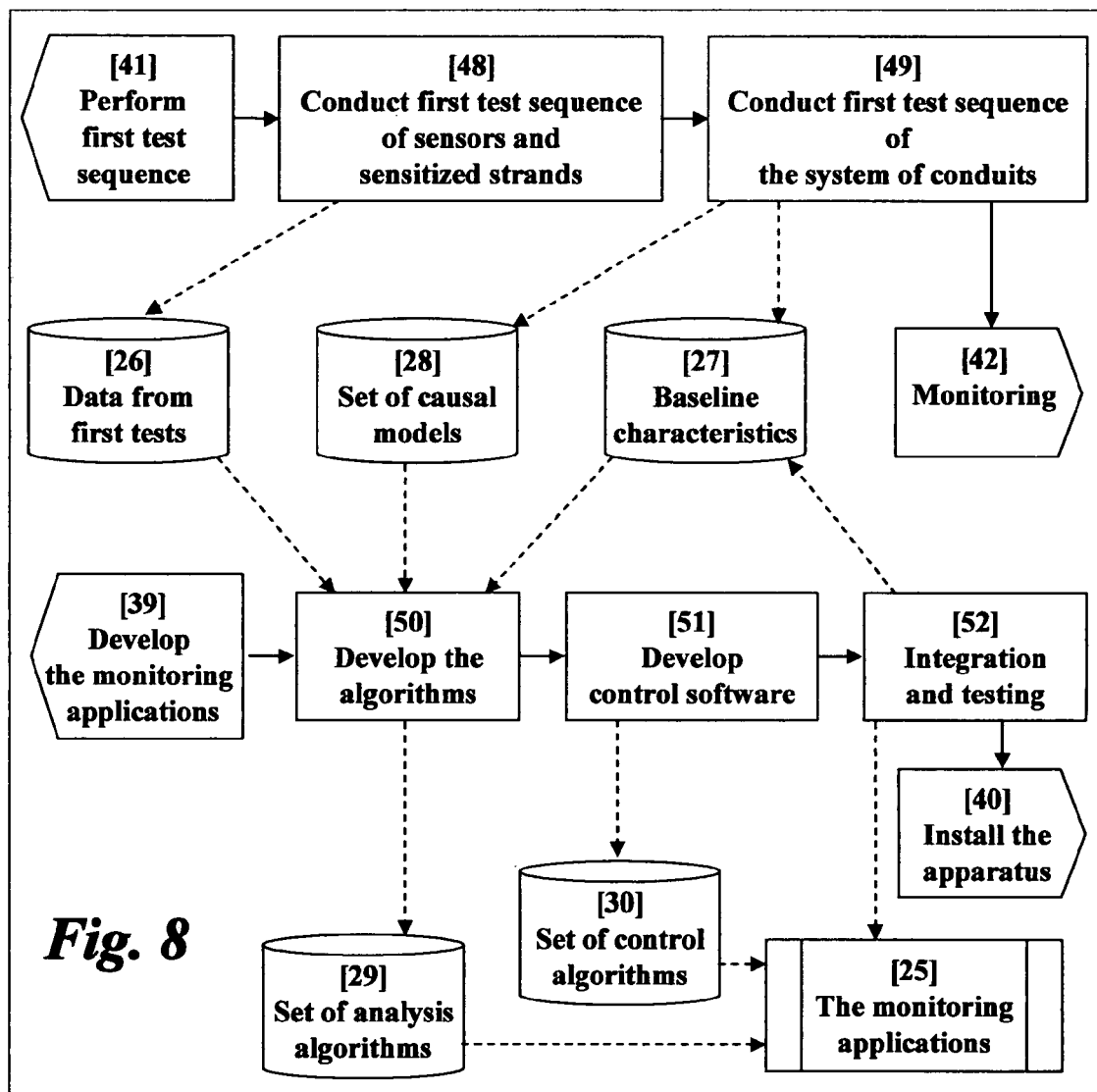

Referring now to FIG. 8, which shows a flow diagram for developing the monitoring application [39]. The process steps in FIG. 8 are: conduct first test sequence [41] of discrete sensors and sensitized strands [48] to obtain characteristic data; and conduct first test sequence of the system of conduits [49] to obtain performance, health state metrics, and stressor data in operating and non-operating domains, as well as causal relationships and other data from degraded and failed modes. The data from the first tests being used for developing the algorithms that infer and/or predict health states. The next step is to develop the algorithms [50] which in turn used to develop control software [51] that control the monitoring applications [25]; then integration and testing [52] to perfect the monitoring applications [25]. FIG. 8 includes objects representing the monitoring applications [25]; a compilation of data from first tests [26]; a set of baseline characteristics [27]; a set of causal models [28]; a set of analysis algorithms [29]; and a set of control algorithms [30]. In a preferred embodiment all the models but the conduit models would be Bayesian models because during operation of the monitoring application the models, algorithms and analysis would be Bayesian, because Bayesian calculus inherently has known error bounds which result in known error bounds for the results calculated by the application. In a preferred embodiment the cause and effect (causal) relationship models are Bayesian algorithms that probabilistically take into account possible stressors and the damage they inflict based on data from a set of discrete sensors and a pattern of sensitized media. A person familiar with computing would understand that commercially available software development tools such as MatLab.™. can be used to develop the algorithms that calculate means, variances, trending, pattern matching, fuzzy logic, distance calculation, truth tables, rules, controls, data fusion, probabilistic inference and other algorithms that comprise the set of analysis algorithms [29] and application development software applications that provide convenient features for integration and testing during development of the monitoring applications.

Referring now to FIG. 9, which shows a flow diagram of the process steps for monitoring [42]. The series of steps shown in FIG. 9 are: initialize for tests [53] and increment the discrete sensor counter [54]; then measure discrete sensor data [55] and determine sensor change [56]. If there is change choose to repeat test [57] to verify the change. If the decision is to not repeat the test then test for if last discrete sensor [58]; if not the last discrete sensor then go to the step increment discrete sensor counter [54] and continue testing discrete sensors until all have been tested. When all discrete sensors have been tested fuse set of discrete sensor data tuples [59]. The next sequence of steps relates to testing for change in the sensitized strands. The process of testing all strands are: increment strand counter [60] then measure sensitized strand data [61] followed by determine strand change [62]. If there is change, choose to repeat strand test [63] to verify the change. If the decision is to repeat the test then repeat the test returning to again measure sensitized strand data [61]. If the decision is not to repeat the test, return to increment strand counter [60] and continue testing until all sensitized strands have been tested by the decision if last strand [64]. When all sensitized strands have been tested then fuse set of strand data tuples [65] and record the sets of sensor and strand data tuples [66] in the set of data from monitoring [31]. Depending on the sensory element, the signal that elicits the response from the sensitized medium can be of various type such as electricity, light, laser, sound, and high frequency waves. If change or discontinuity of any sensitized media occurs, the spatial location of the damage can be measured by reflectometry, signal strength remaining or other remote means. The distance to the damage can be as short as a few millimeters and at least a few meters. The distance can possibly be as long as several miles for laser signals depending on signal loss in the fiber. The cause of the damage can be interpreted by algorithms that take into account possible stressors and the damage inflicted to the sensitized media.

Referring now to FIG. 10 which shows a flow diagram of the steps for diagnosing health states [43]. The first step is to use data from baseline characteristics [27] and data from monitoring [31] to generate weighting parameters [67] that are used to adjust data for temperature and other environmental effects on the accuracy of data values of data from monitoring [31] with the set of causal models [28] and the set of analysis algorithms [29] used in data fusion [68] used combine evidence to diagnose health states of sensors and strands [69]; to diagnose health states of conduit components [70]; to diagnose health states of conduit sections [71], to diagnose health states of system of conduits [72]; to decide to locate damage [73] and if decision is to locate, then perform a measurement algorithih to locate damage [74]. In either case, follow by a process to record data [85] in the set of data from monitoring [31]. My method uses combining data with data fusion using logic, causal relationships and inference algorithms because, in the case of systems of conduits, some states cannot be observed with a discrete sensor and must be inferred with an inference algorithm based on causal relationships and fusion of data from several discrete sensors and sensitized strands sited near, on, in and along the system of conduits. Data fusion used with logic, as used in truth tables and rules, causal relationships and inference algorithms are means for locating the place of damage and reasoning the probable cause of damage from data. Depending on the sensory element, the signal can be of various type such as electricity, light, laser, sound, and high frequency waves. Damage on a section of conduit is detected, located and its cause inferred when erosion, corrosion, breakage or other factor causes at least one sensitized media to change a response characteristic such as causing the reflection of the signal to be shorter than before with an abbreviated measured distance to the point of discontinuity caused by damage. In the case of ambiguity caused by the branches, data from a discrete sensors, a sensor signal source, or data from sensitized strands located at another branch in the tree provide data for an inference algorithm to locate the place of damage.

Referring now to FIG. 11, which shows a flow diagram showing the steps for prognosis [44] which, on detection of damage, uses algorithms such as trending, pattern matching, fuzzy logic, distance calculation, logic, inference and data fusion predicts future damage states, effects and remedial actions based on impact of damage. The steps shown are: predict damage states [75], predict effects [76] processing characteristics selected from the set of baseline characteristics [27] and data selected from the set of data from monitoring [31] with models from the set of causal models [28], using the results thereof to predict health states [77] using the set of analysis algorithms, and use a Bayesian network or other model to predict remedial actions [78] and then record data [85] in the set of data from monitoring [31]. The current invention uses the causal relationships that were initially determined in first tests and improved with learning over time as a means to predict future local, system and end effects of faults and failures as well as remedial actions.

Figure 12:
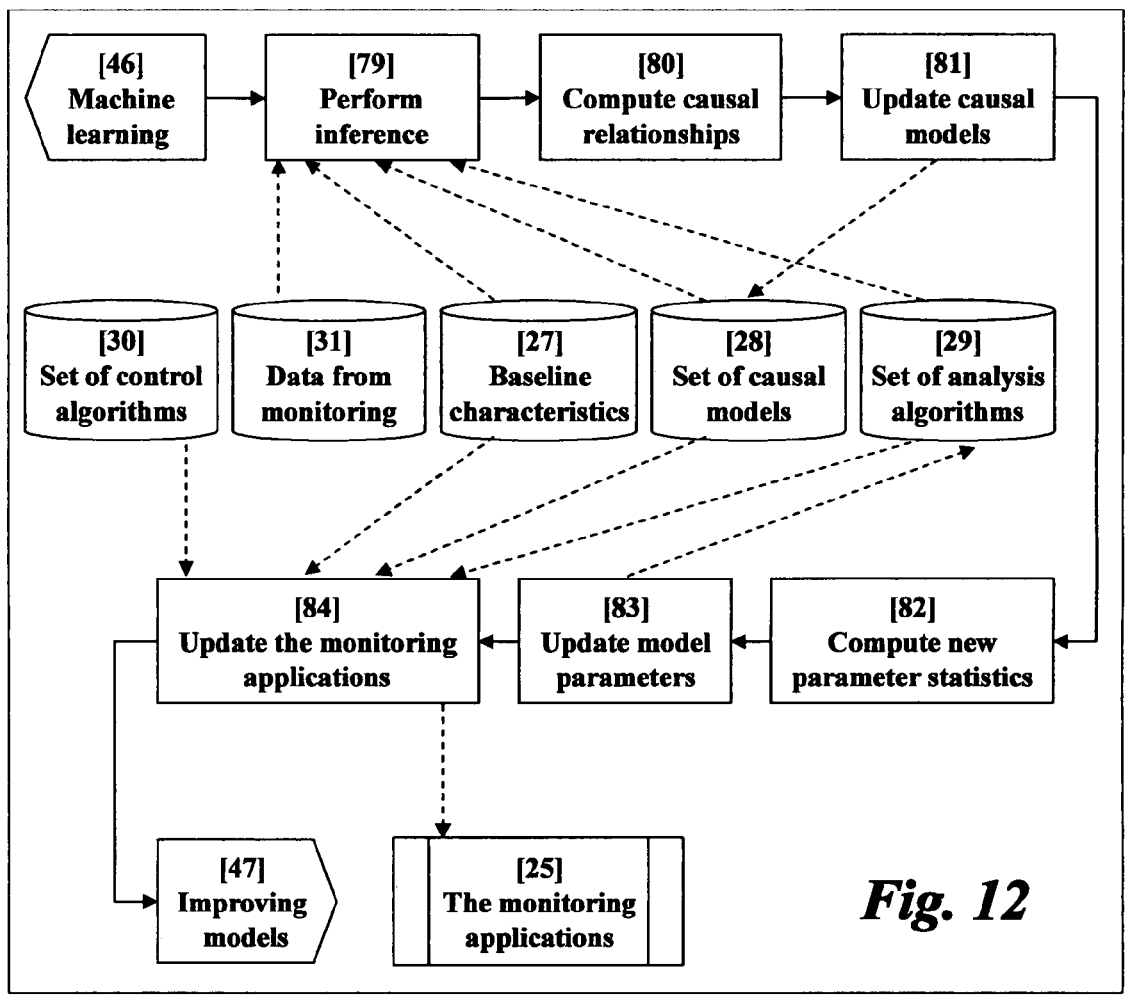

Referring now to FIG. 12, which shows a flow diagram showing the steps for machine learning [46] to improve the accuracy of the inference algorithms, analytical models and causal models [47]. As shown in FIG. 12, the steps for machine learning are: using data from monitoring [31], baseline characteristics [27], and analysis algorithms [29]; perform inference [79] with Boolean logic or a Bayesian algorithm using data from the set of data from monitoring [31], characteristics from the set of baseline characteristics [27], causal models from the set of causal models [28] and analysis algorithms selected from the set of analysis algorithms [29]. The next step is to compute causal relationships [80] based on the inference and thence update causal models [81] replacing previous causal models in the file causal models [28]; then use parameter estimating algorithms to compute new parameter statistics [82]; and update model parameters [83]. The last step shown in FIG. 12 is to revise the monitoring applications [25] by performing the step of update the monitoring applications [84] with the data from the set of control algorithms [30], baseline characteristics [27], the set of causal models [28] and the set of analysis algorithms [29]. A person familiar with the art of automated learning would realize that machine learning algorithms are widely available in books on artificial intelligence and professional papers on artificial intelligence. The machine learning process acts to improve the models by using machine learning algorithms to compute new parameters, models, relationships and characteristics based on actual values of data from monitoring [31] by using statistical analyses and probabilistic reasoning to improve and update the logic, inference algorithms, causal relationships and other analysis components that improve the monitoring applications. A person familiar with artificial intelligence methods would realize that there are teaching and examples of statistical methods for learning algorithms in numerous publicly available text books and papers on statistical methods on artificial intelligence.

Figure 13:
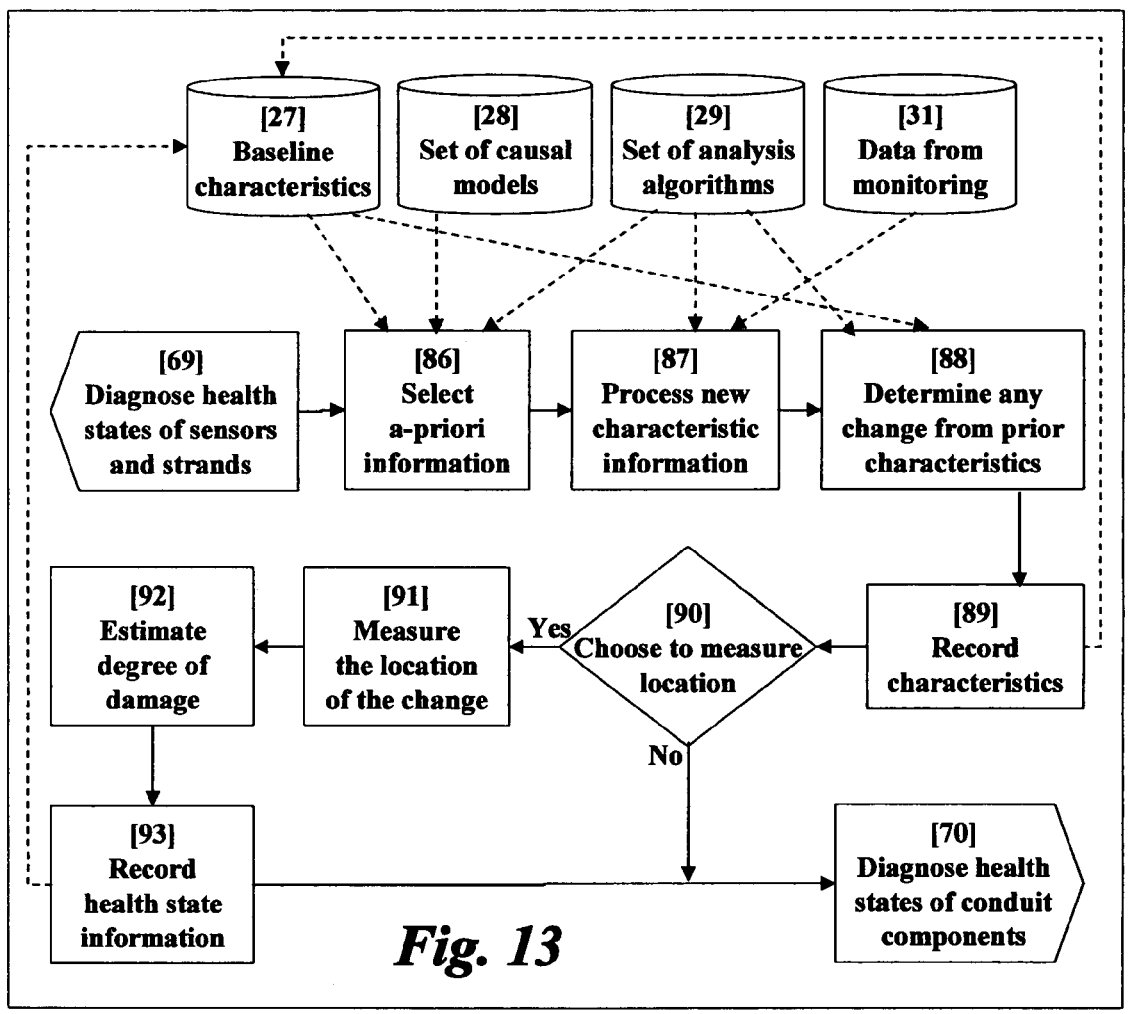

Referring now to FIG. 13 which shows a flow diagram of the steps of diagnosing health states of sensors and strands [69] by using a deductive algorithm, select a-priori information [86] from data sources such as baseline characteristics [27] and the set of causal models [28] (if any) with algorithms selected from the set of analysis algorithms [29]; then process new characteristic information [87] using algorithms selected from the set of analysis algorithms [29] to produce results which are used to determine any changes from prior characteristics based on the recent data from the set of data from monitoring [31] to determine any change from prior characteristics [88] utilizing algorithms selected from the set of analysis algorithms [29]; then record characteristics [89] by placing the results in the set of baseline characteristics [27]; and based on any change make a decision to choose to measure location [90]; if the choice is to measure the location then perform a measurement algorithm to measure the location of the change [91], using either a direct calculation based on the response to the applied signal or apply a measuring technique such as reflectometry on a waveform conducting medium; and using inference or a calculus estimate degree of damage [92] at each point of damage; and record health state information [93] by placing the results in the set of baseline characteristics [27].

Other embodiments can utilize a manual readout device such as a commercially available personal computer or palm computer. Testing by automated readout can be instrumented in any of several implementations depending on the particular applications by interfacing with the microcontroller [13] by way of its input/output connectors.

A person familiar with the art of sensing and using algorithms would know that estimating the speed and depth of damage can be accomplished by an inference algorithm that incorporates spatial parameters of the system of conduits and spatial parameters that describe where the set of discrete sensors and the sensitized strands are located, such as placement of sensitized strands atop one another so that when each in turn is damaged the depth of damage is determined. Cross-talk caused by separated adjacent conduits will not generally be a problem because measurements will usually be performed serially. Non-interfering patterns of discrete sensors and sensitized strands, such as one for voltage and one for light waves, can be laid touching side by side to avoid even a tiny gap that might lead to having an undetected point of damage. Conflicting conducting patterns such as gold and aluminum which both conduct electricity will need spatial clearance or a suitable spacing material to avoid forming junctions, cross-talk or other confounding situations. The pattern of conducting elements can be applied singularly or en masse as an applique embossed on a non-conducting substrate such as polyimide or a fluoropolymer such as EFTE. Or, the pattern of conducting elements can be extruded or embossed directly onto the insulation surface. Whatever the type of pattern helical, coaxial, wavy, etc.) that is used, all distances to a point of damage are also defined.

A person familiar with using sensors and sensing methods for locating sites of damage in a branched tree of conduits would understand that in any embodiment, one or more additional couplings [15] with or without a microcontroller [13] and discrete sensors [19] can be attached to the pattern of sensitized media at locations spaced apart from the first coupling [15], so that differential measurements can be taken at the couplings. The additional information from such measurements at another point of the branches will accurately resolve any ambiguities caused by a plurality of sensitized media in a branched tree of conduits.

A person familiar with sensing would understand that in the case of very long conduits perhaps over 1000 meters, it may be necessary to add additional processors at distanced points, probably at connectors as determined by the range of effectiveness of individual sensors.

While the current invention is described mostly in connection with a presently preferred embodiment thereof, those skilled in the art will recognize that any modifications and changes may be made therein without departing from the true spirit and scope of the invention, which accordingly is intended to be defined solely by the appended claims. For instance, in FIG. 2A. FIG. 3. FIG. 5 and FIG. 6 three distinct sensor elements are shown, but there could be any number arranged in any order. Any person familiar with performing tests for conductivity and reflectometry will concur that any number of sensitized media laid in patterns of any non-interfering arrangement can be utilized.

All of the embodiments above offer the following advantages over present techniques. The present invention detects many damages other than chafing caused by many other causes than abrasion or incision. It matters not whether the conduit is operating or not operating. The present invention detects damage due to virtually all and every stressor by selecting sensitized strands specific to each damaging factors of each stressor. The present invention can be implemented to operate from manual to fully automatic.

Clearly, many modifications and variations of the present invention are possible in light of the above teachings. Which embodiment to employ depends on the application. The choice should be left to system engineers and experts in operating the systems to be protected. It should be therefore understood that, within the scope of the inventive concept, the invention may be practiced otherwise than as specifically claimed.

Operation-Preferred Embodiment

Operation of the invention is accomplished by selecting and procuring or making the sensitized sensor medium appropriate to the environment, damage causing factors, and the conduit; assembling the largely parallel arrangement of said strands onto the support media; adding the points and connections to the electronics (if any), adding appropriate sensors (if any); and authoring algorithms and rules for running in the microcontroller (if any); installing the apparatus onto or into the conduit; performing tests for operability; install the apparatus onto or into the conduit; activate with a suitable power source (if any).

Generally speaking, the method of the current invention comprises a sequence of steps. A first step is creating the said monitoring apparatus and algorithms to periodically monitor at least a portion of the system of conduits at given points in time over a first extended period and, for each point in time, storing in a digital memory a data couplet containing information concerning the parameters, and the point in time; using digital processors to identify couplets having normal values within a predetermined range; and providing an indication of steady state characteristics if the readings for at least a predetermined number of couples are within a first predetermined range; and providing a programmed diagnostic algorithm for assessing risk of damage and extent of deterioration and damage to the monitored conduits; and providing a prognostic algorithm for estimating the remaining useful life of the monitored conduits and components; and providing a protocol for communicating the information about sensed damage, deterioration, as well as diagnostic and prognostic information concerning the health status and integrity of the monitored conduits. Then performing a first test sequence on each of the multiplicity of sensitized medium for the purpose of forming a baseline of characteristic parameters of each said medium for future reference by measuring the characteristics and storing the characteristics in accessible storage medium or location for future use. Then, from time to time, performing the same said test sequence on each of the multiplicity sensitized medium; determining if said measured characteristics are substantially equal to previously measured characteristics, the possible outcomes being: a there is no measurable change to the sensitized portion of the medium b. there is measurable change to the sensitized portion of the medium; c. the medium is disrupted, i.e. broken, eroded, cut through or dissolved; choosing whether to repeat said step of measuring and said step of determining at another point of said medium; if the choice is to repeat, then repeating said steps of measuring and determining. Analyses using deductive algorithms, along with any a priori probability information, is used to: a) process data from said measuring of said set of discrete sensors and said multiplicity of sensitized medium into characteristic information; and b) determine any change of said characteristics from baseline characteristics; and c) record the information for later use; and d) choosing whether to measure the position of the change; if the choice is to measure then measure the location of the change using either direct calculation based on the response to the applied signal; or apply a measuring technique such as reflectometry on a waveform conducting medium; and record the measured value and temporal information if available; and using a calculus estimate the degree of damage for each said sensitized media at each recorded point of damage, for each time if temporal information is recorded.

In operation set of discrete sensors and strands of the sensitized media encasing the segments will be affected by stressors operating on them. End-to-end tests or single ended tests such as measuring light or reflectometry can be used to detect damage to any sensitized media able to carry the waveforms. On detection of said damage my method uses algorithms such as trending, pattern matching, fuzzy logic, distance calculation, logic, inference and data fusion to determine the type, location and cause of the damage as well predict future impacts of the damage if damage is allowed to progress into the protective insulation and eventually the conducting core. Next, the results of the detection, location, and determination of cause are used to initiate or request actions that mitigate or remove the stressor or stressors that are the cause of damage as well as corrective actions to bypass, repair or otherwise deal with the damage. During said actions the damage to the interconnection system is repaired and damaged and sections of the sensitized media used in the embodiment of the invention are replaced or repaired.

The method of the current invention involves a diagnostic and prognostic system for monitoring the health status and integrity of conduits, the system comprising: a plurality of local health status and integrity monitoring devices each capable of inspecting the health status of local individual conduits and conduit components, each local monitoring device having: a centralized data processor coupled to the plurality of local monitoring devices, the centralized data processor for receiving from each local monitoring device the local data concerning its associated conduits, for generating a set of weighting parameters for each local conduit monitoring device, and for communicating the set of weighting parameters to each local conduit monitoring device; and a local data processor of each local monitoring device further for receiving the set of weighting parameters, collecting data regarding the local conduit and analyzing the local data using the set of weighting parameters for local diagnostic and prognostic purposes.

The method of the current invention is used in conjunction with a monitoring device for use in monitoring at least one conduit with at least one conductor for diagnostic purposes, the device comprising: at least one programmed microcontroller or other processor for the purpose of acquiring the sensor information from a set of sensors and sensitized medium, conditioning and normalizing the sensor information based on parameters and environmental condition of the conduit, and for processing the normalized information to provide an output signal indicative of the diagnostic condition and the prognostic estimate of remaining useful life of the conduit and conductors it monitors, a set of sensors having outputs coupled to the programmed processor, at least one sensor being an environmental sensor for providing environmental information indicative of the local environmental condition, and sensors that are strips or strands of heterogeneous sensitized medium said medium either essentially opaque to signal transmission, or selected from the group of mediums that are capable of supporting or conducting an electrical current and voltage, an electromagnetic signal, an optical signal, an audio signal, and an indicating substance with the purpose to provide sensor information indicative of damage to the sensitized medium; with each sensor or strand of sensitized medium being positioned with respect to the conduit to provide information concerning the environment and damage and deterioration to the conduit; and means operatively associated with the programmed processor for operating the processor in a birth certificate mode wherein the outputs of the sensors are processed by the programmed processor and stored in as baseline operational parameters; and means associated with the programmed processor for operating the device in a monitoring mode, after the program has operated in the birth certificate mode, wherein the programmed processor acquires, conditions, and processes the outputs from the sensors, compares the processed outputs to the baseline operating parameters, and provides an indication of the diagnostic condition of the conduit based on the comparisons.

The current invention is a method for diagnosis and prognosis of the health status of conduits, comprising the steps of: determining the requirements for monitoring the system of conduits; defining the functions of diagnostic and prognostic method to meet the requirements; defining the parameters to be sensed and monitored; designing an apparatus with parameter generating components consisting of an assortment of electronics, hardware, software, firmware, a set of discrete sensors, and strands of sensitized medium.

The parameters processed in the algorithms are measurements from a set of discrete sensors and sensors that are strands made up of diverse sensitized media including hollow, filled or solid strands, fibers and strips made with combinations of inorganic, organic or man-made materials. The discrete sensors and sensitized strands are positioned with respect to the conduit to provide information concerning the environment and real or potential damage and deterioration to the conduit; and the sensors produce an optical phenomena when stimulated.

The method of the current invention logically and mathematically combines the environmental and the baseline operational parameters. The results of processing the parameters are indicative of any stress or any damage to the sensitized medium by comparing the processed outputs to the baseline operating parameters, and provides an indication of the diagnostic condition of the conduit based on the comparisons.

The method of the current invention operates as a distributed diagnostic and prognostic method for monitoring the health status and integrity of system of conduits, with data processed by a plurality of local health status and integrity monitoring devices each capable of inspecting the health status of local individual conduits and conduit components, each local monitoring device having: a data processor coupled to the plurality of local monitoring devices, the data processor for receiving from each local monitoring device the local data concerning its associated conduits, for generating a set of weighting parameters for each local conduit monitoring device, and for communicating the set of weighting parameters to each local conduit monitoring device; and a local data processor of each local monitoring device further for receiving the set of weighting parameters, collecting data regarding the local conduit and analyzing the local data using the set of weighting parameters for local diagnostic and prognostic purposes.

A preferred embodiment would include a monitoring device for use in monitoring at least one conduit with at least one conductor for diagnostic purposes, the device comprising: at least one programmed microcontroller or other processor for the purpose of acquiring the sensor information from a set of sensors and sensitized medium, conditioning and normalizing the sensor information based on parameters and environmental condition of the conduit, and for processing the normalized information to provide an output signal indicative of the diagnostic condition and the prognostic estimate of remaining useful life of the conduit and conductors it monitors.

A preferred embodiment would include a set of sensors having outputs coupled to the programmed processor, at least one sensor being an environmental sensor for providing environmental information indicative of the local environmental condition, and sensors that are strips or strands of heterogeneous sensitized medium said medium either essentially opaque to signal transmission, or selected from the group of mediums that are capable of supporting or conducting an electrical current and voltage, an electromagnetic signal, an optical signal, an audio signal, and an indicating substance with the purpose to provide sensor information indicative of damage to the sensitized medium; with each sensor or strand of sensitized medium being positioned with respect to the conduit to provide information concerning the environment and damage and deterioration to the conduit; and means operatively associated with the programmed processor for operating the processor in a birth certificate mode wherein the outputs of the sensors are processed by the programmed processor and stored in as baseline operational parameters; and means associated with the programmed processor for operating the device in a monitoring mode, after the program has operated in the birth certificate mode, wherein the programmed processor acquires, conditions, and processes the outputs from the sensors, compares the processed outputs to the baseline operating parameters, and provides an indication of the diagnostic condition of the conduit based on the comparisons.

In a preferred embodiment the sensor set includes at least one temperature sensor. The monitoring device would reference baseline operational parameters that include the said temperature sensor: (i) means; (ii) variances; (iii) range; (iv) and the overall temperature spectrum characteristics of the conduit.

In a preferred embodiment the sensor set includes at least one vibration sensor and the baseline operational parameters include the said vibration sensor: (i) means; (ii) variances; (iii) range; (iv) and the overall vibration spectrum characteristics of the conduit.

In a preferred embodiment the sensor set includes at least one conduit electromagnetic interference (EMI) sensor and the baseline operational parameters include the said EMI sensor: (i) means; (ii) variances; (iii) range; (iv) and the overall spectrum of EMI characteristics of the conduit.

In a preferred embodiment the sensor set includes at least one strand of temperature sensitized medium and the baseline operational parameters include the said strand of temperature sensitized medium: (i) means; (ii) variances; (iii) range; (iv) and the overall characteristics of the strand.

In a preferred embodiment the sensor set includes at least one strand of corrosivity sensitized medium and the baseline operational parameters include the said strand of corrosivity sensitized medium: (i) means; (ii) variances; (iii) range; (iv) and the overall spectrum of corrosivity characteristics of the strand.

In a preferred embodiment the sensor set includes at least one strand of chafing sensitized medium and the baseline operational parameters include the said strand of chafing sensitized medium: (i) means; (ii) variances; (iii) range; (iv) and the overall characteristics of the strand.

In a preferred embodiment the sensor set includes at least one strand of pressure sensitized medium and the baseline operational parameters include the said strand of pressure sensitized medium: (i) means; (ii) variances; (iii) range; (iv) and the overall characteristics of the strand.

In a preferred embodiment the sensor set includes at least one strand of chemically sensitized medium and the baseline operational parameters include the said strand of chemically sensitized medium: (i) means; (ii) variances; (iii) range; (iv) and the overall characteristics of the strand.

In a preferred embodiment the sensor set includes at least one strand of piezoelectric sensitized medium and the baseline operational parameters include the said strand of piezoelectric sensitized medium: (i) means; (ii) variances; (iii) range; (iv) and the overall characteristics of the strand.

In a preferred embodiment the sensor set includes at least one strand of base metal coated medium and the baseline operational parameters include the said strand of base metal coated medium: (i) means; (ii) variances; (iii) range; (iv) and the overall characteristics of the strand.

In a preferred embodiment the sensor set includes at least one strand of noble metal coated medium and the baseline operational parameters include the said strand of noble metal coated medium: (i) means; (ii) variances; (iii) range; (iv) and the overall characteristics of the strand.

In a preferred embodiment the sensor set includes at least one strand of clad silica sensitized medium and the baseline operational parameters include the said strand of clad silica medium: (i) means; (ii) variances; (iii) range; (iv) and the overall characteristics of the strand.

In a preferred embodiment the sensor set includes at least one strand of fluorescent doped sensitized medium and the baseline operational parameters include the said strand of fluorescent doped sensitized medium: (i) means; (ii) variances; (iii) range; (iv) and the overall characteristics of the strand.

In a preferred embodiment monitoring device would further comprise a visual indicator coupled to the processor for receiving the output signal generated by the algorithms running in the processor, and for providing a visual indication of the diagnostic condition of the conduit based on the output signal.

In a preferred embodiment the sensitized media provides a means for coupling to a plurality of conductors and connectors at spaced apart locations along the branches; and a terminator connected to a first connector; and, a means to attach appropriate signals including, but not limited to, direct current or alternating current electricity, radio waves, audio signals, and beams of light; and a means to attach a signal analysis instrument.

In a preferred embodiment the sensitized media, the signal generators with the signal detectors, and the microcontroller or other computer comprise a means to quantitatively measure changes in signals and secondary effects as a means to detect the presence, degree, and location of deterioration or damage to the insulation material.

In a preferred embodiment the sensitized media is made up of diverse sensitized media including hollow, filled or solid strands, fibers and strips made with combinations of inorganic, organic or man-made materials.

In a preferred embodiment at least one of the sensitized media comprises a mixture of dielectrics.

In a preferred embodiment at least one of the sensitized media which provide data for my method is in coaxial relationship to the insulated cores with linear, curvilinear, or helical format.

In an preferred embodiment at least one of the sensitized media that provide data for my method is fabricated on an inner layer of the insulation.

In an preferred embodiment at least one of sensitized media is fabricated on the outer surface of the insulation.

During selecting the preferred set of discrete sensors and strands of sensitized medium that provide data for my method perform a first test sequence on each of the set of discrete sensors and each of the strands of sensitized medium for the purpose of forming a baseline of characteristic parameters of each said discrete sensor and each said strand of sensitized medium for future reference by measuring the characteristics and storing the characteristics in accessible storage medium or location for future use. Analysis of the data of first tests is used to develop a set of baseline operational parameters that include: (i) means; (ii) variances; (iii) range; (iv) and the overall spectrum characteristics of the operational characteristics of the conduits and system of conduits, the set of discrete sensors and the strands of sensitized medium. Analyzing the said baseline of characteristic parameters provides a means to select those discrete sensors and strands of sensitized medium most appropriate for the intended purpose.

During developing the monitoring application, the developer should perform of a series of first tests with the system of conduits in operational, degraded, and non-operational modes. The first tests would include operation in a range of health states using real or simulated conditions to collect data and measure performance in the presence of causal factors and damage as a means to develop the software monitoring application with diagnostic and prognostic capabilities. The operational characteristics, in turn, are used to develop logic and statistically accurate probabilistic (Bayesian) models of health states of the system of conduits.

The purpose of measuring the characteristics of the system of conduits operating in degraded or faulty states over a period of time is to provide characteristics for developing sufficiently accurate algorithms and models that infer and recognize causal relationships as well as diagnose conditions leading to unhealthy states, diagnose the health state, and predict future health states as a function of time. by measuring the characteristics of degraded states over time. For example, if Bayesian statistical processing of data from a number of tuples at a point in time shows values within a predetermined range they provide an indication of a healthy state, but if processing of the same number of tuples shows values at a point in time are outside a predetermined range they indicate an unhealthy state. The said logic and (Bayesian) inference algorithms provide a baseline for assessing risk of damage and extent of deterioration and damage to the monitored conduits at a point in time; to provide a statistically accurate prognostic algorithm for estimating the remaining useful life of the monitored conduits and components and incorporate machine learning algorithms that work to continuously improve the modeling application.

It is to be noted that a person familiar with the art of sensing would know that Bayesian mathematics, inference algorithms, and software programs are described in detail in numerous widely available text books and publications and articles. Further, said person would agree that Bayesian methods are widely used, and that Bayesian mathematics are statistically accurate with the inherent ability to measure the amount of statistical error in each calculated result.

The data would be collected at predetermined points in time and for each point in time, storing tuples containing information concerning the parameters and the point in time the data was collected. During development the person developing the monitoring application would perform analyses of the tuples, using the results of analysis to develop the logic, inference algorithms and models that in combination form the diagnostic and prognostic functions of the at least one monitoring application.

Once sufficiently developed and tested the monitoring device together with the at least one monitoring application would be installed by applying, placing, attaching or embedding the monitoring device, the set of discrete and a multiplicity of strands of said sensitized medium along the length of a system of conduits, wherein said strands of sensitized medium has a first end and a second end, said strands of sensitized medium being placed such that damage inducing factors such as a solid object, gas, liquid, powder or electromagnectic waves contact strands of said sensitized medium prior to contacting a conduit.

A next step in my method is verification and validation of the at least one monitoring application accomplished by performing a first test sequence on each of the multiplicity of the sensitized medium for the purpose of forming a baseline of characteristic parameters each sensitized medium for future reference by measuring the characteristic parameters and storing characteristic parameters in accessible storage medium or location for future use. The process of verification and validation is performed for each operating domain of the system of conduits by periodically monitoring at least a portion of the system of conduits at given points in time over a first extended period and, for each point in time, storing in a digital memory a data couplet containing information concerning said parameters, and point in time; and forming tuplets that represent the time of the sample, identity of the sensor, and said parameter values. During monitoring my method uses programmed algorithms to identify tuplets having normal values within a predetermined range; and providing an indication of steady state characteristics if said parameter values for at least a predetermined number of tuples are within a first predetermined range. During the verification and validation process, in a preferred embodiment, the method is tested in a manner introducing stresses and damage providing tests of the programmed diagnostic algorithms for assessing risk of damage and extent of deterioration and damage to the monitored conduits. In a preferred embodiment, as damage is detected during monitoring, the process of verification and validation tests-the predictive algorithms for estimating remaining useful life of the monitored conduits and components and tests the protocol for communicating information about sensed damage, deterioration, and as well as diagnostic and prognostic information concerning the health status and integrity of the monitored conduits.

After installation of the monitoring device from time to time perform the same said first test sequence on each discrete sensor and on each of the multiplicity sensitized medium for the purpose of determining if said measured characteristics are substantially equal to previously measured characteristics. The possible outcomes being: a there is no measurable change to the characteristics; b. there is measurable change to the characteristics; c the characteristics indicate the discrete sensor or sensitized medium under test is disputed, i.e. broken, eroded, cut through or dissolved; choosing whether to repeat said step of measuring and said step of determining perhaps at another point of said medium; if the choice is to repeat, then repeating said steps of measuring and determining; using a deductive algorithm along with any a priori probability information to: a) process data from said measuring into characteristic information; and b) determine any change of said characteristics from baseline characteristics; and c) record the information for later use; and d) choosing whether to measure the location of the change; if the choice is to measure then measure the location of the change using either direct calculation based on the response to the applied signal; or apply a measuring technique such as reflectometry on a waveform conducting medium; and record the measured value and temporal information if available; and. using a calculus estimate the degree of damage for each said sensitized media at each recorded point of damage, for each time if temporal information is recorded.

Once the monitoring application has been developed, verified, and validated, the next step is integration, testing, and operational use with one or more system of conduits. In operational use, the monitoring application processes the data from monitoring with logic and algorithms to sense damage, locate damage, perform diagnostics and prognostics of the health state of the set of discrete sensors, the health state of the set of sensitized strands, and the health state of the system of conduits.

In a preferred embodiment of my method, there would be a protocol for communicating the information about sensed damage, deterioration, as well as diagnostic and prognostic information concerning the health status and integrity of the monitored conduits.

Once the said apparatus and the monitoring application are sufficiently developed, the ability to meet requirements should be validated by testing under realistic conditions.

Reduction to Practice

In the course of reducing the invention to practice we acquired and used several commercially solid and hollow coated fiber technologies. We acquired fibers from Polymicro Technologies, Fiberguide Industries, and Lucent Technologies. There are literally hundreds of different commercial fiber products, each with different properties. According to a preferred embodiment of the present patent, we formed a substrate of a commercially available polyimide film. To the said substrate we attached and glued fibers that were of approximately equal diameter in a largely parallel repeated and measureable alignment. The said fibers were a fiber surface-coated with a piezoelectric substance, an aluminum coated fiber, a gold coated fiber, and a silica optical fiber coated with polyimide. We selected the piezoelectric coated fiber for its ability to generate electrical signals during abrasion to indicate evidence rubbing. We selected the fiber coated with aluminum for the purpose to sense and locate damage of corrosion. We selected the fiber gold plated fiber as a control to differentiate chemical corrosion of aluminum from chafing and cut-through laceration. We selected a silica core optical fiber coated with polyimide insulation as a control.

Next, the film with the attached fibers was wrapped to surround the surface of a conduit consisting of several insulated electrical wires. We recorded the geometry variables for use in accurately measuring the distance from the end to a point of damage.

In a parallel effort, we loaded commercially available software into the remote computer. We used the Matlab.™. software to process sampled data and test Boolean equations and Netica.™. software for making probabilistic estimates using a probabilistic calculus called a Bayesian Belief Network. Next, we connected each fiber surface to the digitizing input of the microcontroller circuit and obtained and recorded characteristic measurements.

We conducted experiments using seeded damage. The experiments were successful in detecting seeded damage. The experiments consisted of salt water for slow corrosion, rubbing with and without fine pumice to simulate erosion causing chafing, knife cuts causing lacerations, and direct flame causing quick oxidation of aluminum and melting of plastics. Sensor data collected by the microcontroller was transmitted to the remote computer. Digitized waveforms from reflectometry were processed with a MatLab.™. Time Domain Reflectometer simulator program. When a fiber filled with ink was breached the ink leaked out showing the ability to mark the point of damage. We used the Bayesian Belief Network to determine the most probable cause of damage from sensed data.

We performed tests with a commercially available encapsulated marking substance to mark points of damage caused by lacerations, erosion, corrosion, burning, arcing, and dissolution. A person familiar with the art of using liquid filled fibers would recognize that when breached by a stressor the liquid filed fiber will leak fluid when a pressure differential occurs and that said pressure differentials are especially common in traversing altitudes of aircraft flight regimes.

Conclusion, Ramifications, and Scope

The information in this patent disclosure discloses the idea, embodiment, operation of the invention in order to support the stated claims. The scope of the claims includes variants of the use of inference algorithms, logic and other mathematical and statistical methods in conjunction with processors processing data from a set of discrete sensors and patterns of diverse and different sensitized media formed, laminated, extruded, glued, taped, on or in materials such as insulation and materials used to construct various types of conduits. The various types of conduits include, but are not limited to, harnesses and cables of electrical and fiber optic systems as well as conduits comprised of pipes and hoses carrying liquids, gases and solids.

A person familiar in sensing would appreciate and understand that the discrete sensors and the strands of sensitized medium may not be necessary in some alternate embodiments.

A person familiar in the art of sensitized medium and their arrangement would appreciate that they can be substituted freely with equivalent components to adapt to specific application requirements.

A person familiar in developing algorithms for sensing would appreciate and understand that some steps shown in FIG. 7 through FIG. 13 may not be necessary in some alternate embodiments.

A person familiar in the art of developing computer programs would appreciate that the algorithms can be substituted freely with equivalent components to adapt to specific application requirements.

A person familiar in the art of using microcontrollers would appreciate and agree that various commercial equivalent microcontroller products or even a unique design using discrete components can be substituted freely to adapt to specific application requirements.

A person familiar in the art of chemistry would understand that the marking substances can also be formulated to provide a functionality at extreme temperatures as well a self healing mechanisms to control damage, or prophylactic properties to prevent further damage. Said person would agree that marking substances can be formulated to provide visual reference, such as fluorescing under ultra-violet light, or provide other attributes for detection such as radioactivity, smell, or coloration at the place of damage using means such as instruments, humans, or animals trained to detect the released substance. The said person would agree that the said marking substance can be formulated to provide ability to work at extreme temperatures, have low capillary adhesion, to be eroded by chafing to be a marker powder, and other desired attributes for use in applications.

A person familiar with design and use of sensors would agree that it matters not whether any fiber is used for multiple purposes such as detecting movement and vibration because such uses are not conflicting. The said person would agree that fibers can be selected to collect evidence of causal factors associated with application specific environments.

A person familiar in the art of building sensors would understand that the attachment point [6] may be unnecessary as direct coupling may be possible. Also, a person familiar in the art would recognize that the surface and shape of the apparatus can be rectangular, round, or any shape as required by the shape of the conduit.

A person familiar in the art would understand that for use of a reflectometer a built in signal decoupler would enable determining is which direction the damage occurred. A person familiar in the art would understand that various shapes of the pattern of signal conduits such as parallel wavy lines are equivalent.

A person familiar in making insulated conduits would understand that the pattern of conducting elements can be embedded or embossed on a non-conducting substrate such as mylar or polyimide. Or, the pattern of conducting elements can be extruded or embossed directly onto the inner insulation surface and then overcoated with insulation material. Several embedded layers can be combined with a surface layer if desired.

A person familiar in the art of sensors would understand that if an electrically conductive sensitized media was used as a sensor, a load resistor or capacitor to a segment of the applique conduit for performing measurements to determine and localize a discontinuity or change in impedance between the two connectors. The couplings [15] could self contain a multiplicity of miniature lasers such as a vertical cavity semiconductor lasers and detection by a light detector perhaps implemented with a directional coupler along with a microcomputer. Similar configurations would use radio frequencies, microwaves, or spectral energy with appropriate detectors.

A person familiar in the art of sensors would understand that mixed sensitized media can be used and formulated for specific sensory properties such as electrically conductive, optically conductive, chemically sensitive, etc. and that sensitized surfaces can be of diverse properties such as inert, piezoresistive, piezoelectric, semiconductor, chemically soluble, chemically reactive, etc.

A person familiar in the art of optical materials such as glass or plastic fibers would understand that mixed sensitized media can be used such as optically conductive sensitized media, and that a photo-diode, photo-resistor or photo-capacitor could be used with an selected wavelength photo-emitters to determine and localize a discontinuity or change in optical impedance in the distance of the conduit.

A person familiar in signal measurement would agree that while it is possible to make measurements on a terminated and active insulated conduit, it is also possible to make measurements on an un-terminated insulated conduit. Said person would also understand that no signal is added or taken from the conduit, which is insulated. However, the accuracy of measurement is greatest when the distance between the measuring instrument (e.g. a reflectometer) is small and the terminating impedance is lowest. It will also be understood measurements can be made over more than one segment of a conduit with reduced accuracy. This is consistent with the use of reflectometry in testing of multiple segments of conduits in long distance communication systems and long distance electrical lines.

A person familiar in the art of sensors and sensing would agree that shape of the strands of sensing material can be circular like that of fibers or any manufacturable shape including but not limited to square, trapezoidal, parallelograms, and oval.

A person familiar in the art of sensors and sensing would agree that the width of the conducting material may not be as important as for electrical signals; and may be quite independent of width of the conducting material for optical and fluorescent fibers especially when evanescent escape is minimal. Further, a person familiar in the art would understand that a decoupler would enable determining is which direction the damage occurred.

A person familiar in the art of sensors would agree that a pattern of discrete sensors and strands of sensitized media can touch if touching is not a source of confounding information such as caused by a metal to metal short or interference in a light path.

A person familiar in the art of sensors would agree that a plurality of heterogeneous sensitized media in diverse shapes can be used including but not limited to filaments, ribbons, strips, or deposits and extrusions.

A person familiar in the art of sensors would agree that the types of sensitized media can be homogeneous or heterogeneous, can be made from differing yet compatible materials, and that a selection of heterogeneous materials (e.g. gold and aluminum) allows use of pattern recognition and logical inference.

A person familiar in the art of sensors would agree that damage to the sensitized media that causes significant change in impedance or discontinuity, causes the reflected characteristics to be changed shortened and that the location of the point of damage is calculated by measuring the distance from the source of the pulse as a function of known frequency and known time of the return pulse by using a signal processing algorithm similar in function to a Fast Fourier Transform. If the distance can be in one of several directions a decoupler can be used to limit the pass through of the waveform to a single direction.

A person familiar in the art of sensors would agree that the foreshortening of a fiber doped with a fluorescing material would reduce lumens contained and reflected to the source.

A person familiar in the art of florescent illumination of doped fibers would agree that the foreshortening of a fiber doped with a fluorescing material would reduce lumens reflected to the source. The location of the point of damage is accomplished by measuring the amount of lumens sensed at the source. If the distance can be in one of several directions a one-way optical grating can be used to limit the pass through of the lumens to a single direction.

A person familiar in the art of damage prevention would understand that the preferred configuration will result in damage detection before any damage failure of the inner insulation protecting the core.

I claim:

1. A method for assessing a health status of a system of conduits, the assessing comprising:

determining requirements for monitoring the system of conduits; and selecting parameters to be sensed and monitored; and selecting components consisting of electronics, hardware, software, firmware, a set of discrete sensors and strands of sensitized medium; and designing and manufacturing a form and fit of a monitoring device comprised of said components; and applying, placing, attaching or embedding the monitoring device and sensors consisting of discrete sensors and a multiplicity of strands of said sensitized medium along the length of a conduit, said set of discrete sensors and strands of sensitized medium being placed such that damage inducing factors affect said set of discrete sensors and strands of sensitized medium; and determining by a combination of measurement by signal processing and deductive algorithms whether, when, where and to what extent said damage inducing factors have caused damage; and with an algorithm using said monitoring device to periodically monitor at least a portion of the set of discrete sensors over a first extended period and, for each monitor, storing in a digital memory a data tuplet containing information concerning said parameters; and forming tuplets that represent a time of a sample, identity of the sensor, and parameter values; and using digital processor algorithms to identify tuplets having normal values within a predetermined range; and providing an indication of steady state characteristics if said parameter values for at least a predetermined number of tuples are within a first predetermined range; and providing a programmed diagnostic algorithm for assessing risk of damage to the set of discrete sensors and extent of deterioration and damage to the monitored conduits; and providing an algorithm for estimating remaining useful life of the monitored conduits and components; and providing a protocol for communicating information about sensed damage, deterioration, as well as diagnostic information concerning a health status and integrity of the monitored conduits, components and system of conduits; and performing a first test sequence on each of the multiplicity of said strands of sensitized medium for the purpose of forming a baseline of characteristic parameters of each said sensitized strand of medium for future reference by measuring the characteristic parameters and storing characteristic parameters in an accessible storage medium or location for future use; and from time to time performing the same said first test sequence on each of the multiplicity of strands of sensitized medium; and making a test measurement of said strands of sensitized medium for the purpose of determining if said measured characteristic parameters are substantially equal to previously measured characteristic parameters, the possible outcomes being:

there is no measurable change to the sensitized medium; and there is measurable change to the sensitized medium; and the medium is disrupted, broken, eroded, cut through or dissolved; and choosing whether to repeat said step of making a test measurement of said sensitized medium; and if the choice is to repeat, then repeating said steps of measuring the characteristic parameter and determining; and if said measured characteristic parameters are substantially equal to previous measured characteristic parameters with the digital processor, using a deductive algorithm along with any a priori probability information to:

process data from said measuring of said multiplicity of sensitized medium into characteristic parameters; and determine any change of said characteristic parameters from recorded characteristic parameters; and record the characteristic parameters for later use; and choose whether to measure to locate the change; and if the choice is to locate, then measure using either direct calculation based on response to a measuring technique; and record a measured value and temporal information if available; and using a calculus estimate a degree of damage for each said sensitized media at each recorded point of damage, for each time if temporal information is recorded.

2. The method of claim 1 further comprising a technique to predict future local, system and other effects of damage.

3. The method of claim 1 wherein the characteristic parameters are a single-ended measure of characteristics of light.

4. The method of claim 1 wherein parameters measured at spaced apart locations along the branches are used in an algorithm to resolve ambiguities caused by a plurality of sensitized media in a branched tree of conduits.

5. The method of claim 1 further comprising implementing the method with wireless communication devices.

6. The method of claim 1 further comprising means to warn of stresses and other situations that potentially would result in damage to components of a system of conduits.

7. The method of claim 1 which includes a means to quantitatively measure changes in signals and secondary effects as a means to detect the presence, degree, and location of deterioration or damage.

* * * * *